US008826748B2

(12) United States Patent
Nakamura et al.

(10) Patent No.: US 8,826,748 B2
(45) Date of Patent: Sep. 9, 2014

(54) STRESS-DETECTING ELEMENT, SENSOR MODULE, AND ELECTRONIC APPARATUS

(75) Inventors: Tomoaki Nakamura, Nagano (JP); Tsutomu Nishiwaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 13/480,000

(22) Filed: May 24, 2012

(65) Prior Publication Data

US 2012/0304778 A1    Dec. 6, 2012

(30) Foreign Application Priority Data

May 31, 2011   (JP) ................................. 2011-121987

(51) Int. Cl.
*G01L 1/00*   (2006.01)

(52) U.S. Cl.
USPC .................... 73/862.473; 73/862.471; 73/774

(58) Field of Classification Search
USPC ...................... 73/776, 777, 862.473, 862.471
See application file for complete search history.

(56) References Cited

U.S. PATENT DOCUMENTS

| 7,509,859 B2 * | 3/2009 | Kai ............................ 73/514.33 |
| 2007/0270217 A1 * | 11/2007 | Rabin ............................. 463/37 |
| 2008/0173092 A1 * | 7/2008 | Hattori et al. .............. 73/514.34 |
| 2011/0121591 A1 | 5/2011 | Nishiwaki |
| 2011/0193363 A1 | 8/2011 | Nishiwaki |

FOREIGN PATENT DOCUMENTS

| JP | 2006-208248 A | 8/2006 |
| JP | 2009-294140 A | 12/2009 |
| JP | 2011-112459 A | 6/2011 |
| JP | 2011-163945 A | 8/2011 |

* cited by examiner

*Primary Examiner* — Lisa Caputo
*Assistant Examiner* — Roger Hernandez-Prewit
(74) *Attorney, Agent, or Firm* — Global IP Counselors, LLP

(57) ABSTRACT

A stress-detecting element includes a support body, a support film, a first piezoelectric element, first and second elastic parts. The support body has an opening part with first and second rectilinear sections extending parallel to each other. The support film blocks off the opening part. The first piezoelectric element straddles the first rectilinear section from an interior area to an exterior area of the opening part as seen in plan view. The first elastic part straddles the first rectilinear section from the interior area to the exterior area of the opening part. The second elastic part straddles the second rectilinear section from the interior area to the exterior area of the opening part. The first and second elastic parts respectively have first and second elastic end sections disposed in the interior area of the opening part and spaced apart from each other.

8 Claims, 12 Drawing Sheets

STRESS-DETECTING ELEMENT, SENSOR MODULE, AND ELECTRONIC APPARATUS

CROSS-REFERENCE TO RELATED APPLICATIONS

This application claims priority to Japanese Patent Application No. 2011-121987 filed on May 31, 2011. The entire disclosure of Japanese Patent Application No. 2011-121987 is hereby incorporated herein by reference.

BACKGROUND

1. Technical Field

The present invention relates to a stress-detecting element for detecting a shearing force that acts in a shearing direction and pressing force that acts in a direction orthogonal to the shearing force, a sensor module provided with the stress-detecting element, and an electronic apparatus provided with the sensor module.

2. Related Art in the past there has been known a gripping device that uses a robot arm to grip and lift an object for which the weight and coefficient of friction are not known. In such a gripping device, it is necessary to detect a force (pressing force) that acts in a direction orthogonal to the gripping surface and a force (shearing force) that acts in a planar direction of the gripping surface, in order to avoid damage to the object and to avoid losing grip and dropping the object. There are known sensors for detecting such forces (e.g., see Japanese Laid-Open Patent Application Publication No. 2006-208248).

A tactile sensor described in the above mentioned publication has a structural assembly which includes a cantilever structure that extends from an edge part of an opening provided in a sensor substrate. The structural assembly is composed of a planar sensing part, and a hinge part for coupling the sensing part and the sensor substrate together. An electroconductive magnetic film is formed on the sensing part of the structural assembly, a piezoresistance film is formed on the hinge part, and the electroconductive magnetic film and the piezoresistance film are made conductive. In this configuration, an electrode is disposed on the hinge part and the hinge part is bent by pressure, whereby electric current generated by the piezoresistance of the hinge part flows from an electrode. The tactile sensor has a plurality of structural assemblies such as that described above formed on the sensor substrate, a portion of these structural assemblies being held erect in relation to the sensor substrate, and the other portion being held parallel to the sensor substrate. An elastic body is disposed on the sensor substrate, and the erect structural assemblies are embedded in the elastic body.

SUMMARY

In a tactile sensor such as that described in the above mentioned publication, there are problems in that the configuration has a complicated spatial structure in which the structural assembly of the cantilever structure stands erect, there are complicated manufacturing steps for applying a magnetic field to bend or otherwise manipulate the structural assembly of the cantilever structure during the manufacture thereof, and productivity is poor.

In response thereto, it is possible to consider a stress-detecting element in which a membrane is disposed on the substrate having an opening part so as to block the opening part, arrange the piezoelectric elements along the interior and exterior of the membrane, and to cover the upper part with an elastic film. Such a stress-detecting element can be readily manufactured and made smaller because the film member for forming a membrane, the piezoelectric elements, and the elastic film are layered and formed over the substrate in which the opening part is formed.

However, in such a stress-detecting element, there is a drawback in that the signal value outputted from the piezoelectric elements is reduced and detection precision is liable to be reduced when the bending distance of the membrane is short in the case that the elastic film is added.

In view of the drawbacks such as those described above, an objective of the present invention is to provide a stress-detecting element, a sensor module, and an electronic apparatus that have good productivity and high stress detection precision.

A stress-detecting element according to one aspect of the present invention includes a support body, a support film, a first piezoelectric element, a first elastic part and a second elastic part. The support body has an opening part with a first rectilinear section and a second rectilinear section extending parallel to each other. The support film is disposed over the support body and blocks off the opening part. The first piezoelectric element is disposed over the support film along the first rectilinear section of the opening part of the support body so as to straddle the first rectilinear section from an interior area of the opening part to an exterior area of the opening part as seen in plan view along a film thickness direction of the support film. The first piezoelectric element is configured and arranged to output an electric signal upon deformation. The first elastic part is disposed over the support film along the first rectilinear section of the opening part of the support body so as to straddle the first rectilinear section from the interior area of the opening part to the exterior area of the opening part as seen in plan view. The first elastic part has a first elastic end section disposed in the interior area of the opening part as seen in plan view. The second elastic part is disposed over the support film along the second rectilinear section of the opening part of the support body so as to straddle the second rectilinear section from the interior area of the opening part to the exterior area of the opening part as seen in plan view. The second elastic part has a second elastic end section disposed in the interior area of the opening part as seen in plan view. The second elastic end section is spaced apart from the first elastic end section.

As used herein, the phrase "the first rectilinear section and the second rectilinear section extending parallel to each other" in the present aspect allows for slight error tolerance, and includes, in addition to the configuration in which the first rectilinear section and the second rectilinear section are perfectly parallel, configurations in which, e.g., the first rectilinear section and the second rectilinear section are slightly inclined yet generally parallel to each other.

In the present aspect, the stress-detecting element has the support film formed in a state that blocks off the opening part and the support film is disposed over the support body in which the opening part having the first rectilinear section and the second rectilinear section is disposed. The first piezoelectric element disposed over the support film so as to straddle the first rectilinear section from the inside to the outside of the opening part. Also, the first elastic part that straddles the first rectilinear section and the second elastic part that straddles the second rectilinear section are disposed over the support body. Herein, as described above, the support film in the area within the opening part is referred to as a membrane.

In such a stress-detecting element, when a shearing force is applied to the first elastic part and to the second elastic part, the first elastic part and the second elastic part flexibly deform along the direction in which shearing force has been applied (detected direction of shearing force), and strain is generated in the membrane. In the present aspect, the shearing force can be measured by using the first piezoelectric element to detect the amount of bending of such a membrane.

In this case, the membrane is preferably bent (deformed) in the form of a sinusoid in order to improve detection precision. For example, in the case that a shearing force acts in the direction from the first rectilinear section to toward the second rectilinear section, the first rectilinear section side of the membrane deforms so as to enter into the opening part side, and the second rectilinear section side of the membrane deforms so as to lift away in the direction away from the opening part. On the other hand, in the case that a shearing force acts in the direction from the second rectilinear section toward the first rectilinear section, the first rectilinear section of the membrane deforms so as to lift away and the second rectilinear section of the membrane deforms so as to enter into the opening part. Such membrane deformation is detected to make it possible to detect the direction in which the shearing force operates in addition to the magnitude of the shearing force.

In the case of a configuration in which the elastic body is disposed so as to cover the entire membrane, when the first rectilinear section side of the membrane bends, the vicinity where the inflection point with the bending of the second rectilinear section is formed is obstructed from deforming by the rigidity of the elastic part, and the amount of bending is reduced. In this case, the signal value outputted from the first piezoelectric element is also reduced and the precision of detecting the shearing force is reduced.

In response to the above, according to the present aspect, a gap is formed between the first elastic part and the second elastic part since the first elastic end section of the first elastic part and the second elastic section of the second elastic part are spaced apart from each other. In other words, there is a location in which the first elastic part and the second elastic part do not exist in the center part of the membrane. In such a configuration, since the elastic part does not exist over the support film between the first elastic part and the second elastic part, displacement of the membrane is not obstructed. Therefore, an inflection point can be advantageously formed between the bending of the membrane formed by the first elastic part and the bending of the membrane formed by the second elastic part. In the case that, e.g., shearing force is applied to the first elastic part and the second elastic part from the first rectilinear section toward the second rectilinear section, the position in which the first elastic part of the membrane is disposed thereby displaces considerably to the opening part side, and the position in which the second elastic part is disposed displaces considerably in the direction away from the opening part. As a result, sinusoidal bending with considerable amplitude can be formed. Accordingly, the signal value outputted from the first piezoelectric element is also increased, and detection precision can be improved.

The stress-detecting element of the present aspect has a simple configuration in which the support film, the first piezoelectric element, the first elastic part, and the second elastic part are merely disposed over the support body. Therefore, manufacturing is simple and manufacturing costs can also be reduced.

In the stress-detecting element of the present aspect, the first elastic end section of the first elastic part and the second elastic end section of the second elastic part are preferably parallel to the first rectilinear section and the second rectilinear section as seen in plan view.

In the same manner as the aspect described above, the phrase "the first elastic end section and the second elastic end section are parallel to the first rectilinear section and the second rectilinear section" in the present aspect includes, in addition to the configuration of a perfectly parallel state, configurations in which at least one of the first elastic end section and the second elastic end section is in a generally parallel state so as to be slightly inclined in relation to the first rectilinear section and the second rectilinear section.

Here, in the case that the first elastic end section and the second elastic end section are not parallel, the bending of the membrane is liable to have different shapes depending on the location. For example, when a shearing force is applied along the +X direction from the first rectilinear section toward the second rectilinear section and the bending state of the membrane is viewed along the Y direction, which is orthogonal to the X direction, there are cases in which the bending state in the position Y=a on the membrane and the bending shape in the position Y=b (b≠a) are different shapes in the case that the first elastic end section and the second elastic end section are not parallel. In such a case, the shearing force cannot accurately be detected. Even when the first elastic end section and the second elastic end section are parallel, there may be cases in which the bending shape is different depending on the position on the membrane in the same manner as when the elastic end sections are not parallel to the first rectilinear section (second rectilinear section).

In response to the above, in the present aspect, the first elastic end section, the second elastic end section, the first rectilinear section, and the second rectilinear section are parallel, as described above, and regardless of the Y coordinate, the bending shape of the membrane in the X direction is the same, and the shearing force can be accurately detected.

In the stress-detecting element of the present aspect, a distance from the first rectilinear section of the opening part to the first elastic end section is preferably equal to a distance from the second rectilinear section to the second elastic end section as seen in plan view.

With this arrangement, the stress that the first elastic part imparts to the membrane, and the stress that the second elastic part imparts to the membrane are in different directions, and the magnitude of the stress is substantially the same. Therefore, the amount of bending of the first rectilinear section side of the membrane and the amount of bending of the second rectilinear section side are substantially the same amount of bending, and the bending directions are opposite. Accordingly, the membrane can be made to bend in the shape of a sinusoid in which the center point of the membrane is the inflection point.

In the stress-detecting element of the present aspect, each of the distance from the first rectilinear section of the opening part to the first elastic end section and the distance from the second rectilinear section to the second elastic end section is preferably 10% to 30% of a distance from the first rectilinear section to the second rectilinear section.

The membrane is preferably bent into a sinusoidal shape in order to increase the amount of bending of the membrane. In other words, it is preferred that the amplitude of the membrane be maximum at positions corresponding to X=T/4 and X=3T/4, with a position corresponding to X=T/2 being the inflection point, where the +X direction is the direction from the first rectilinear section to the second rectilinear section on the membrane, the X coordinate of the first rectilinear section is 0, and the X coordinate of the second rectilinear section is T.

In the case that the distance from the first rectilinear section to the first elastic end section, and the distance from the second rectilinear section to the second elastic end section are less than 10% of the distance from the first rectilinear section to the second rectilinear section, stress from the first elastic part and the second elastic part is not suitably transmitted to the membrane, and the amount of bending of the membrane is reduced. On the other hand, in the case that the distance from the first rectilinear section to the first elastic end section, and the distance from the second rectilinear section to the second elastic end section are greater than 30% of the distance from the first rectilinear section to the second rectilinear section, the positions corresponding to X=T/4 and X=3T/4 in which the amplitude of the membrane is maximum cannot achieve sufficient amplitude because the first elastic part and the second elastic part covering the membrane is relatively large, and the amount of bending of the membrane is reduced. In response to the above, in the case that the distance from the first rectilinear section to the first elastic end section and the distance from the second rectilinear section to the second elastic end section are within a range of 10% to 30% of the distance from the first rectilinear section to the second rectilinear section as in the present aspect, the bending of the membrane is not obstructed, and sufficient stress is transmitted from the first elastic part and the second elastic part. A configuration is further preferably used in which the first elastic end section and the second elastic end section are disposed such that the distance from the first rectilinear section to the first elastic end section and the distance from the second rectilinear section to the second elastic end section are about 20% to 25% of the distance from the first rectilinear section to the second rectilinear section, i.e., in the vicinity of the positions corresponding to X=T/4 and X=3T/4 in which the amplitude of the membrane is maximum, whereby the amount of bending of the membrane can be maximized. In this case, a stronger signal can be outputted from the first piezoelectric element, and detection precision can be further improved.

In the stress-detecting element of the present aspect, the first elastic part preferably covers the first piezoelectric element.

In a configuration in which the first elastic part covers only on a portion of the first piezoelectric element, the amount of bending in the portion of the first piezoelectric element on which the first elastic part does not exist is decreased. In this case, the bending of the first piezoelectric element is reduced and the outputted signal is weakened. In response to this situation, the present aspect has a configuration in which the first elastic part preferably covers the entire first piezoelectric element. Therefore, the bending of the first piezoelectric element is increased, signal strength can be increased, and the detection precision can be further improved.

The stress-detecting element of the present aspect preferably further includes a second piezoelectric element disposed over the support film along the second rectilinear section of the opening part of the support body so as to straddle the second rectilinear section from the interior area of the opening part to the exterior area of the opening part as seen in plan view. The second piezoelectric element is preferably configured and arranged to output an electric signal upon deformation.

In the present aspect, the second piezoelectric element is disposed along the second rectilinear section. Therefore, a shearing force can be detected by sum of the signal values of both the first piezoelectric element and the second piezoelectric element, and the detection precision can be further improved.

In the stress-detecting element of the present aspect, the opening part preferably further includes a third rectilinear section and a fourth rectilinear section extending orthogonal to the first rectilinear section and the second rectilinear section. The stress-detecting element preferably further includes a third piezoelectric element, a third elastic part and a fourth elastic part. The third piezoelectric element is preferably disposed over the support film along the third rectilinear section of the opening part of the support body so as to straddle the third rectilinear section from the interior area of the opening part to the exterior area of the opening part as seen in plan view. The third piezoelectric element is preferably configured and arranged to output an electric signal upon deformation. The third elastic part is preferably disposed over the support film along the third rectilinear section of the opening part of the support body so as to straddle the third rectilinear section from the interior area of the opening part to the exterior area of the opening part when viewed in the plan view. The third elastic part preferably has a third elastic end section disposed in the interior area of the opening part as seen in plan view. The fourth elastic part is preferably disposed over the support film along the fourth rectilinear section of the opening part of the support body so as to straddle the fourth rectilinear section from the interior area of the opening part to the exterior area of the opening part as seen in plan view. The fourth elastic part preferably has a fourth elastic end section disposed in the interior area of the opening part as seen in plan view, the fourth elastic end section being spaced apart from the third elastic end section.

With this arrangement, in addition to detection of shearing force in the X direction from the first rectilinear section toward the second rectilinear section, shearing force in the Y direction from the third rectilinear section toward the fourth rectilinear section can be detected by the third piezoelectric element. The direction and magnitude of the shearing force along the X direction and the direction and magnitude of the shearing force along the Y direction are calculated based on signals from the first piezoelectric element and the third piezoelectric element, and these data are subjected to a vector calculation, whereby the direction and magnitude of the shearing force that acts in a two-dimensional plane can be calculated.

The stress-detecting element of the present aspect preferably further includes a fourth piezoelectric element disposed over the support film along the fourth rectilinear section of the opening part of the support body so as to straddle the fourth rectilinear section from the interior area of the opening part to the exterior area of the opening part as seen in plan view. The fourth piezoelectric element is preferably configured and arranged to output an electrical signal upon deformation.

In the present aspect, a shearing force in the Y direction from the third rectilinear section toward the fourth rectilinear section can be accurately detected based on signal values outputted from both the third piezoelectric element and the fourth piezoelectric element in the same manner as described above.

In the stress-detecting element of the present aspect, the first elastic part, the second elastic part, the third elastic part, and the fourth elastic part are preferably integrally formed as one-piece, unitary member.

According to the present aspect, the first elastic part, the second elastic part, the third elastic part, and the fourth elastic part are integrally formed as one-piece, unitary member. In such a configuration, a slit-shaped gap is disposed in these integrally formed elastic parts in order to form a gap between the elastic parts, whereby the stress-detecting element having the configuration described above can be readily formed, manufacturing efficiency can be improved, and the configuration can be simplified.

A sensor module according to another aspect of the present invention includes a sensor array having a plurality of the stress-detecting elements described above that are arranged in a form of an array.

In the present aspect, the sensor module is provided with the sensor array in which stress-detecting elements are arranged in the form of an array. Here, the stress-detecting elements are readily manufactured and have high shearing-force precision, as described above. Therefore, the sensor module is readily manufactured and shearing force can be detected with high precision using a plurality of stress-detecting elements.

An electronic apparatus according to another aspect of the present invention includes the sensor module described above, and a signal processing part configured and arranged to process electrical signals outputted from the sensor module.

The electronic apparatus of the present aspect includes the sensor module described above. Therefore, various processing can be carried out based on a high-precision shearing force detection signal outputted from the sensor module.

BRIEF DESCRIPTION OF THE DRAWINGS

Referring now to the attached drawings which form a part of this original disclosure:

FIG. 3 is a view showing the state in which the object has made contact with the stress-detecting element, wherein

FIG. 4 is a view showing the state in which the object has made contact with the stress-detecting element, wherein

FIG. 5 is a view schematically showing the electric potential generated by the piezoelectric film, wherein

DETAILED DESCRIPTION OF EXEMPLARY EMBODIMENTS

First Embodiment

The stress-detecting element of a first embodiment of the present invention is described below with reference to the accompanying drawings.

1. Configuration of Stress-Detecting Element

Figure 1:
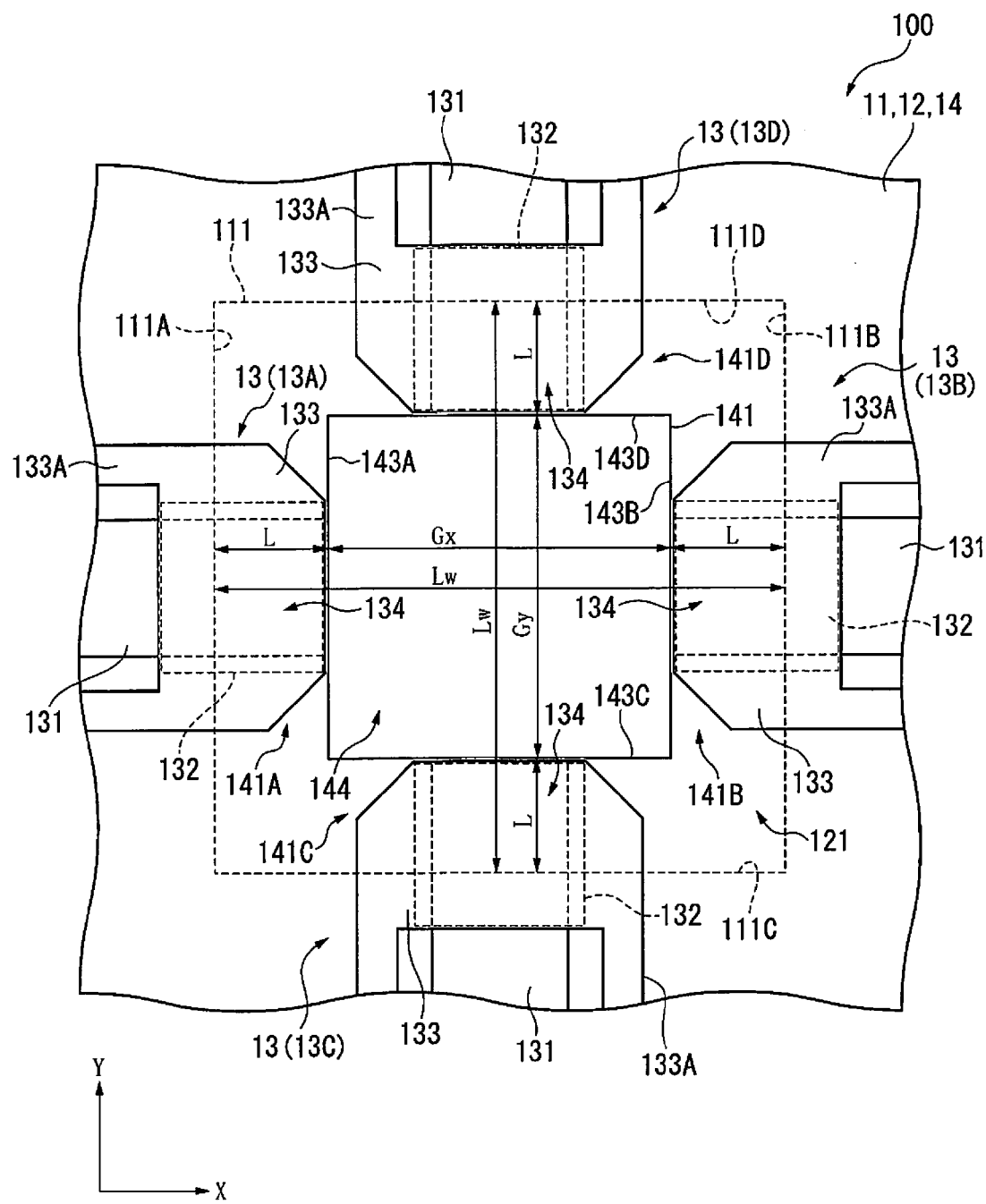
FIG. 1 is a plan view showing the schematic configuration of the stress-detecting element of a first embodiment of the present invention.
Figure 2:
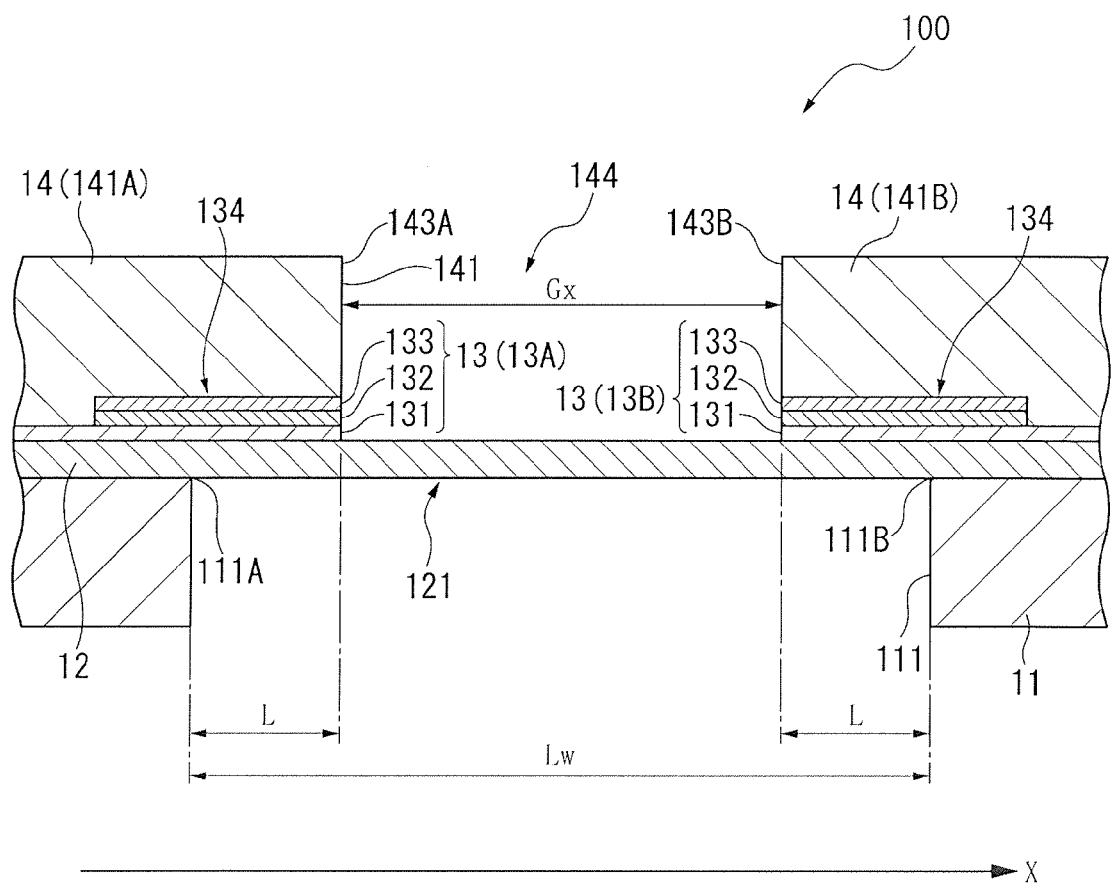
FIG. 2 is a cross-sectional view showing the schematic configuration of the stress-detecting element of the first embodiment.

FIG. 1 is a plan view showing the schematic configuration of the stress-detecting element 100 of the first embodiment; and FIG. 2 is a cross-sectional view of the stress-detecting element 100.

The stress-detecting element 100 is configured by layering a support film 12, piezoelectric elements 13, and an elastic body 14 composed of a first elastic part, a second elastic part, a third elastic part, and a fourth elastic part of the present invention, on a sensor substrate 11, which is the support body of the present invention, as shown in FIG. 1. In FIG. 1, portions of the piezoelectric elements 13 are shown in solid lines to better understand the structures thereof although the piezoelectric elements 13 are disposed below the elastic body 14 as shown in FIG. 2. The stress-detecting element 100 is an element for detecting shearing force and positive pressure applied when an object makes contact with the elastic body 14.

Configuration of Sensor Substrate

The sensor substrate 11 is composed of, e.g., Si, and is formed to a thickness dimension of, e.g., 200 μm. An opening part 111 is formed in the sensor substrate 11, as shown in FIGS. 1 and 2. The opening part 111 is formed in a square shape when the sensor substrate 11 is viewed from above (sensor plan view) from the thickness direction of the sensor substrate 11, and the sides of the square shape are composed of a first rectilinear section 111A, a second rectilinear section 111B, a third rectilinear section 111C, and a fourth rectilinear section 111D. In the present embodiment, the opening part 111 is formed such that the length of one side is, e.g., 500 μm.

Configuration of Support Film

The support film 12 is formed from a bilayer structure (not shown) composed of an $SiO_2$ layer formed to a thickness dimension of, e.g., 3 μm the sensor substrate 11, and a $ZrO_2$ layer having a thickness dimension of, e.g., 400 nm layered on the $SiO_2$ layer. In this case, the $ZrO_2$ layer is a layer formed for preventing the piezoelectric film 132 from peeling away when the later-described piezoelectric element 13 is baked and formed. In other words, in the case that the piezoelectric film 132 is formed from, e.g., PZT, the Pb contained in the piezoelectric film 132 diffuses into the $SiO_2$ layer during baking when a $ZrO_2$ layer has not been formed, the melting point of the $SiO_2$ layer is reduced, air bubbles form in the surface of the $SiO_2$ layer, and the PZT peels away due to the air bubbles. Another problem in the case that a $ZrO_2$ layer is not present is that the bending efficiency is reduced or otherwise degraded in relation to strain on the piezoelectric film 132. It is possible to avoid peeling of the piezoelectric film 132, reduction in the bending efficiency, and other drawbacks in the case that a $ZrO_2$ layer is formed on the $SiO_2$ layer in response to this situation.

Also, when the sensor is viewed from above as shown in FIG. 1, the area of the support film 12 that is blocked off by the opening part 111 shall be referred to as a membrane 121 in the following description.

Configuration of Piezoelectric Element

The piezoelectric elements (first piezoelectric element 13A to fourth piezoelectric element 13D) 13 are formed on the membrane 121 along the rectilinear sections 111A to 111D of the opening part 111 and in the shape of a rectangle in which the long sides of the elements are in the same direction as the rectilinear direction of the rectilinear sections 111A to 111D. The piezoelectric elements 13 are arranged so as to straddle from the interior area of the opening part 111 to the exterior area of the opening part 111 with the rectilinear sections 111A to 111D of the opening part 111 disposed therebetween, respectively. In the present embodiment, the piezoelectric element 13 disposed along the first rectilinear section 111A is the first piezoelectric element 13A, the piezoelectric element 13 disposed along the second rectilinear section 111B is the second piezoelectric element 13B, the piezoelectric element 13 disposed along the third rectilinear section 111C is the third piezoelectric element 13C, and the piezoelectric element 13 disposed along the fourth rectilinear section 111D is the fourth piezoelectric element 13D.

These piezoelectric elements 13 are configured by layering a lower electrode 131, a piezoelectric film 132, and an upper electrode 133.

The piezoelectric film 132 is formed by forming, e.g., lead zirconate titanate (PZT) into the shape of a film having a thickness dimension of, e.g., 500 nm. In the present embodiment, PZT is used as the piezoelectric film 132, but any material can be used provided that the material is capable of generating a charge when the film undergoes a change in stress, and examples of the material that may be used include lead titanate ($PbTiO_3$), lead zirconate ($PbZrO_3$), lead lanthanum titanate (($Pb,La)TiO_3$), aluminum nitride (AlN), zinc oxide (ZnO), and polyvinylidene fluoride (PVDF). The piezoelectric film 132 generates a difference in electric potential between the lower electrode 131 and the upper electrode 133 in accordance with the amount of bending when the support film bends due to shearing force. An electric current from the piezoelectric film 132 flows to the lower electrode 131 and the upper electrode 133, and an electric signal is outputted.

The lower electrode 131 and the upper electrode 133 are electrodes formed so as to sandwich the piezoelectric film 132 in the thickness direction. The lower electrode 131 is formed on the surface facing the membrane 121 of the piezoelectric film 132, and the upper electrode 133 is formed on the surface opposite of the surface on which the lower electrode 131 is formed.

The lower electrode 131 is a film-shaped electrodes formed to a thickness dimension of, e.g., 200 nm, and is formed straddling the inside and outside of the membrane 121 along the direction orthogonal to the respective rectilinear section 111A to 111D on which the piezoelectric elements 13 are formed. The lower electrode 131 may be any electrode provided that the lower electrode is an electroconductive thin film having electroconductivity, but in the present embodiment, for example, a structured film composed of Ti/Ir/Pt/Ti layers is used.

The upper electrode 133 is a film-shaped electrode formed to a thickness dimension of, e.g., 50 nm. The upper electrode 133 covers the area between the end parts of the piezoelectric film 132 in the lengthwise direction and is formed parallel to the rectilinear sections 111A to 111D on which the piezoelectric elements 13 are formed. A draw-out part 133A is formed on the end part of the upper electrode 133 in the lengthwise direction. The use of such an electrode pattern makes it possible to readily draw out the electric signal outputted from the piezoelectric elements 13 without covering the electrode with an insulation film or the like and without a portion in which the lower electrode 131 and the upper electrode 133 make direct contact with each other.

Any material may be used as the upper electrode 133 provided that the material is an electroconductive thin film, similarly with respect to the lower electrode 131, and in the present embodiment, an Ir thin film is used.

In such a piezoelectric element 13, the portion in which the lower electrode 131, the piezoelectric film 132, and the upper electrode 133 are superimposed along the film direction is a piezoelectric layering portion 134 for detecting the amount of bending of the support film.

Configuration of Elastic Body

The elastic body 14 is a film formed so as to cover the support film 12 and the piezoelectric elements 13 as described above. In the present embodiment, for example, polydimethylsiloxane (PDMS) is used as the elastic body 14, but no limitation is imposed thereby, and the elastic body may also be formed from a synthetic resin or the like having elasticity, and or another elastic material. The thickness dimension of the elastic body 14 is not particularly limited, and is, e.g., 300 µm.

The elastic body 14 has a square-shaped slit 141 formed in the center area of the opening part 111 when the sensor is viewed from above. In other words, the elastic body 14 is provided with a first elastic part 141A disposed straddling the inside and outside of the opening part 111 along the first rectilinear section 111A, a second elastic part 141B of the second rectilinear section 111B that is disposed straddling the inside and outside of the opening part 111, a third elastic part 141C of the third rectilinear section 111C that is disposed straddling the inside and outside of the opening part 111, and a fourth elastic part 141D of the fourth rectilinear section 111D that is disposed straddling the inside and outside of the opening part 111. The slit 141 is formed by the end part of the first elastic part 141A on the internal peripheral side of the opening part 111 (a first elastic end section 143A), the end part of the first elastic part 141B on the internal peripheral side of the opening part 111 (a second elastic end section 143B), the end part of the first elastic part 141C on the internal peripheral side of the opening part 111 (a third elastic end section 143C), and the end part of the first elastic part 141D on the internal peripheral side of the opening part 111 (a fourth elastic end section 143D).

In this case, the first elastic end section 143A and the second elastic end section 143B are parallel to the first rectilinear section 111A (the second rectilinear section 111B) and spaced apart from each other to face each other across an elastic-parts gap Gx. The third elastic end section 143C and the fourth elastic end section 143D are parallel to the third rectilinear section 111C (the fourth rectilinear section 111D) and spaced apart from each other to face each other across an elastic-parts gap Gy (second elastic-parts gap).

In the first elastic part 141A (second elastic part 141B), the distance L from the first rectilinear section 111A (the second rectilinear section 111B) to the first elastic end section 143A (the second elastic end section 143B) is preferably formed so as to be about 10% to 30%, more preferably 20% to 25%, of the opening dimension (the distance from the first rectilinear section 111A to the second rectilinear section 111B) Lw of the opening part 111.

In the case that the distance L from the first rectilinear section 111A (111B) to the first elastic end section 143A (second elastic end section 143B) is less than 10% of the opening dimension Lw, when the shearing force and stress acts on the elastic body 14 and causes elastic deformation, stress that is commensurate to the elastic deformation is not sufficiently transmitted from the first elastic part 141A (second elastic part 141B) to the membrane 121, and the amount of bending of the membrane 121 is reduced. On the other hand, in the case that the distance L from the first rectilinear section 111A (second rectilinear section 111B) to the first elastic end section 143A (second elastic end section 143B) is greater than 30% of the opening dimension Lw, the size of a hollow part 144 is reduced. In this case, the bending of the membrane 121 that corresponds to the portion in which the hollow part 144 is disposed is obstructed by the first elastic part 141A and the second elastic part 141B, and the amount of bending of the membrane 121 is reduced. As described above, when the bending of the membrane 121 is reduced, the signal value outputted from the first piezoelectric element 13A and/or the second piezoelectric element 13B is reduced, and detection precision is degraded.

In contrast, in the case that the distance L from the first rectilinear section 111A (second rectilinear section 111B) to the first elastic end section 143A (second elastic end section 143B) is in a range of 10% to 30%, preferably 20% to 25%, of the opening dimension Lw, the first elastic end section 143A and the second elastic end section 143B are positioned in the vicinity of the location in which the bending of the membrane 121 is maximum, and the amount of bending of the membrane 121 is increased. Accordingly, the signal outputted from the first piezoelectric element 13A and/or the second piezoelectric element 13B is increased and the detection precision can be improved.

For the same reason, in relation to the third elastic part 141C and the fourth elastic part 141D, the distance L from the third rectilinear section 111C (fourth rectilinear section 111D) to the third elastic end section 143C (fourth elastic end section 143D) is preferably in a range of 10% to 30%, more preferably 20% to 25%, of the opening dimension (the distance from the third rectilinear section 111C to the fourth rectilinear section 111D) Lw.

In the present embodiment, the length dimension Lw of one side of the opening part 111 (the distance from the first rectilinear section 111A to the second rectilinear section 111B, and the distance from the third rectilinear section to the fourth rectilinear section) is 500 μm, and the distance L from the rectilinear sections 111A to 111D of the opening part to the slit 141 is 100 μm.

2. Operation of Stress-Detecting Element

The operation of the stress-detecting element 100 described above will next be described with reference to the accompanying drawings.

With the stress-detecting element 100, when a shearing force is applied along the X direction, the shearing force is detected by the first piezoelectric element 13A and the second piezoelectric element 13B; and when a shearing force is applied along the Y direction, the shearing force is detected by the third piezoelectric element 13C and the fourth piezoelectric element 13D. When a pressing force is applied orthogonal to the sensor substrate 11, the pressing force is detected by the first piezoelectric element 13A, the second piezoelectric element 13B, the third piezoelectric element 13C, and the fourth piezoelectric element 13D.

Here, as examples, the direction of detection of the shearing force will be described for the case in which a shearing force is applied in the X direction of the membrane 121, and for the case in which when positive pressure is applied in addition to the shearing force. In the case in which the shearing force is applied in the Y direction, the shearing force is detected by the same operation, and a description thereof is omitted.

Figure 3A:
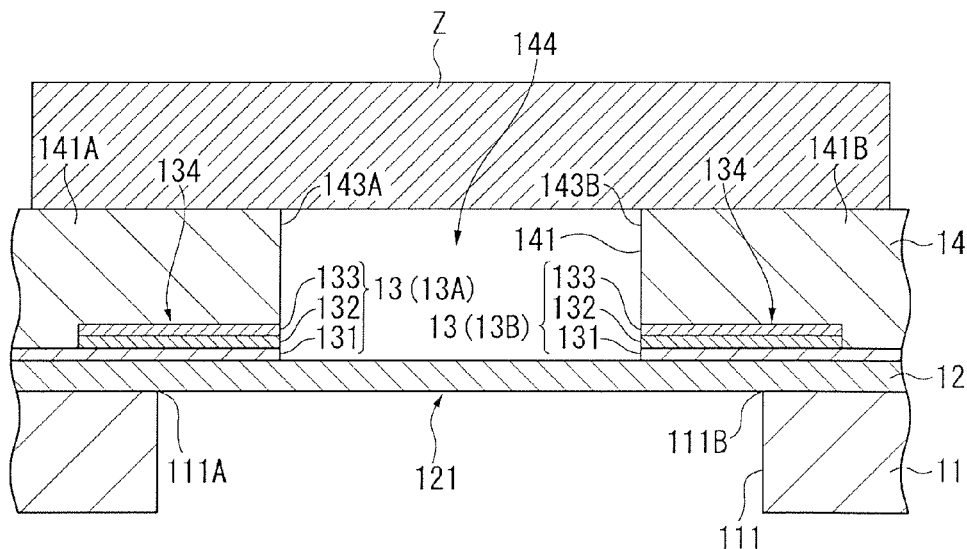
FIG. 3A is a view showing the state prior to deformation of the membrane.
Figure 3B:
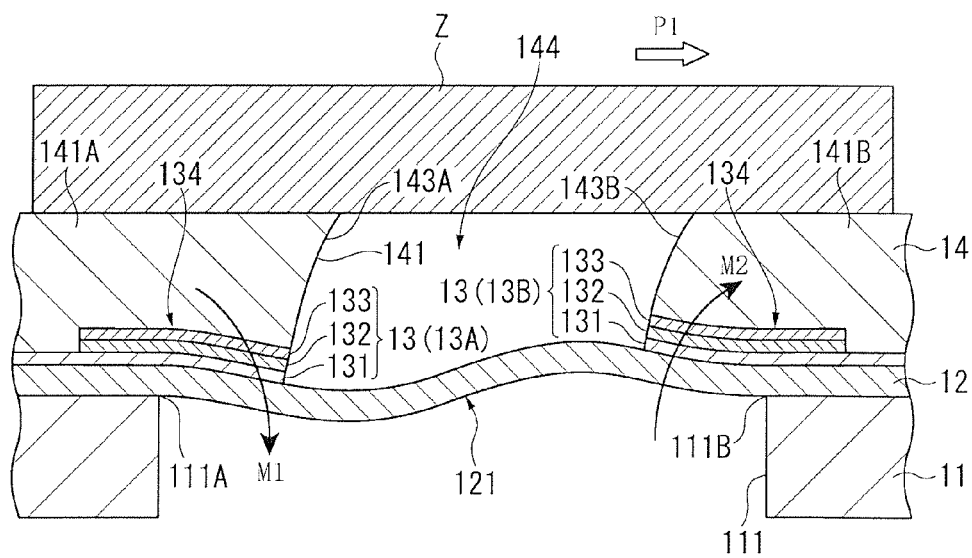
FIG. 3B is a view showing the state in which the membrane has been deformed by shearing force.
Figure 4A:
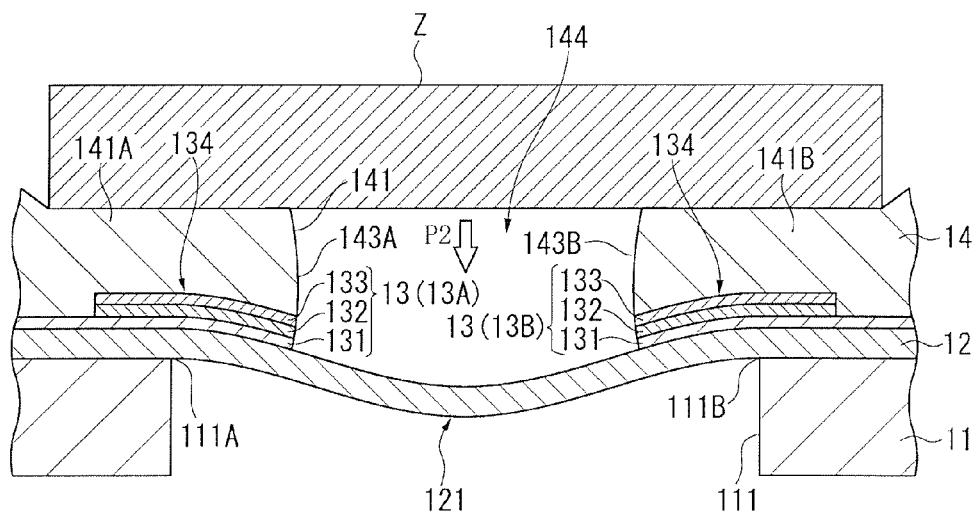
FIG. 4A is a view showing the state in which the membrane has been deformed by positive pressure.
Figure 4B:
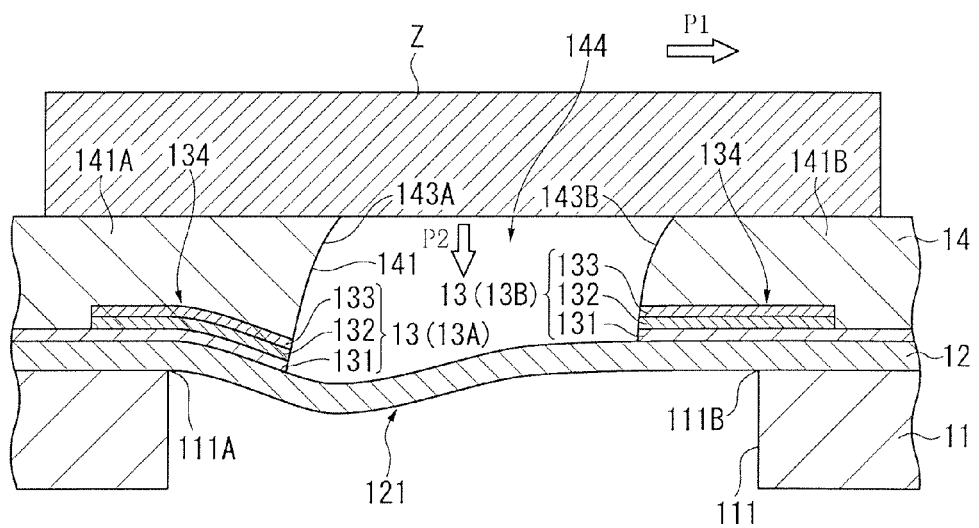
FIG. 4B is a view showing the state in which the membrane has been deformed by both shearing force and positive pressure.

FIG. 3 is a view showing the state in which an object Z has made contact with the stress-detecting element 100, wherein FIG. 3A is a view showing the state prior to deformation of the membrane 121, and FIG. 3B is a view showing the state in which the membrane has been deformed by shearing force. FIG. 4A is a view showing the state of deformation of the membrane 121 when a positive pressure has been applied from the state of FIG. 3A, and FIG. 4B is a view showing the state in which the membrane 121 has been deformed when both shearing force and positive pressure have been applied in the +X direction from the state of FIG. 3A.

The stress-detecting element 100 is configured such that when the object Z makes contact with the elastic body 14, as shown in FIG. 3A, and shearing force is applied in the direction of the arrow P1, as shown in FIG. 3B.

In other words, when a shearing force is generated in the elastic body 14, the surface on the −X side of the membrane 121 is pressed to the opening part 111 side by the first elastic part 141A. Therefore, a moment force into the opening part 111 is generated as indicated by the arrow M1. In the case of the surface on the +X side, on the other hand, the surface on the +X side of the membrane 121 is pulled away by the second elastic part 141B in a direction away from the opening part 111, and a moment force that lifts away from the opening part 111 is generated as indicated by the arrow M2.

An inflection point appears at the center point of the position where the slit 141 is disposed, more specifically, the center point of the membrane 121, and the membrane 121 curves in the form of a sinusoid.

In the case that positive pressure is applied to the elastic body 14, the first elastic part 141A and the second elastic part 141B press the membrane 121 to the opening part side, as shown in FIG. 4A, and the membrane 121 therefore bends so as to sink into the opening part 111 side.

In the case that both shearing force and positive pressure are applied to the elastic body 14, a deformed state of the membrane 121 such as that shown in FIG. 3B and a deformed state of the membrane 121 such as that shown in FIG. 4A occur simultaneously, and as a result, the entire membrane 121 sinks into the opening part 111, and bending is generated in the form of a sinusoid, as shown in FIG. 4B.

When the membrane 121 bends in the manner described above, an electric signal that corresponds to the bending direction and bending amount of the membrane 121 is outputted by the piezoelectric elements 13.

Figure 5A:
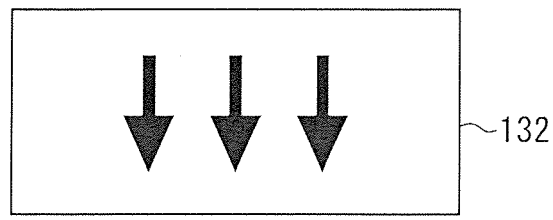
FIG. 5A is a view showing the state in which the piezoelectric film has not deformed.
Figure 5B:
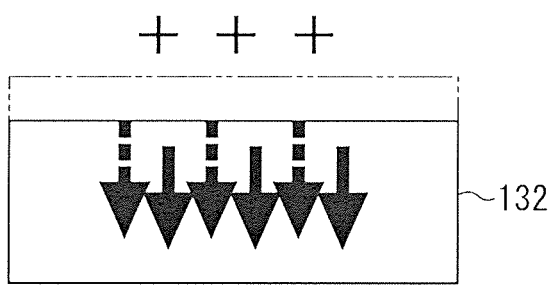
FIG. 5B is a view showing the state in which the piezoelectric film has been elongated.
Figure 5C:
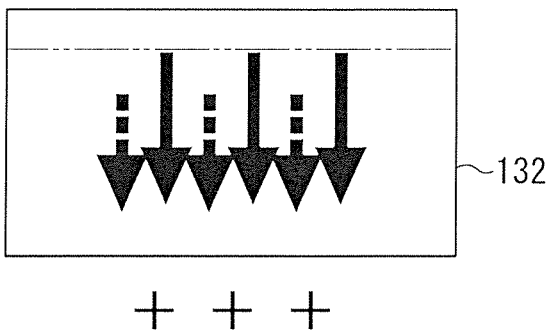
FIG. 5C is a view showing the state in which the piezoelectric film has been compressed.

FIG. 5 is a view schematically showing the electric potential generated by the piezoelectric film 132, wherein FIG. 5A is a view showing the state in which the piezoelectric film 132 has not deformed, FIG. 5B is a view showing the state in which the piezoelectric film 132 has been elongated, and FIG. 5C is a view showing the state in which the piezoelectric film 132 has been compressed.

In order to detect the pressing force and shearing force using the stress-detecting element 100 as described above, voltage is applied between the upper electrode 133 and the lower electrode 131 in advance, and the electrodes are polarized with the application of the voltage, as shown in FIG. 5A. In this state, a difference in electric potential is generated in the piezoelectric film 132 when bending is generated in the membrane 121.

In the case that the piezoelectric elements 13 bend to the opening part 111 side, a pulling stress is generated in the piezoelectric film 132 in the in-plane direction of the piezoelectric film 132, and the film thickness is reduced, as shown in FIG. 5B. Thereby, in the piezoelectric film 132, the magnitude of polarization moment is reduced, a positive charge sufficient to offset the difference between the initial polarization value is generated in the contact surface with the upper electrode 133, and a negative charge is generated in the contact surface with the lower electrode 131. Therefore, an electric current flows in the direction from the lower electrode 131 to the upper electrode 133 and is outputted as an electric signal.

On the other hand, in the case that the piezoelectric elements 13 bend in the direction away from the opening part 111, compression stress is generated in the piezoelectric film 132, and the thickness of the piezoelectric film 132 increases, as shown in FIG. 5C. Thereby, in the piezoelectric film 132, the magnitude of polarization moment is increased, a negative charge is generated in the upper electrode 133, and a positive charge is generated in the lower electrode 131. Accordingly, an electric current flows in the direction from the upper electrode 133 to the lower electrode 131, and is outputted as an electric signal.

3. Method for Calculating Stress in Stress-Detecting Element

The method for calculating the positive pressure and the shearing force when the stress-detecting element 100 has operated as described above will next be described.

In the stress-detecting element 100 of the present embodiment, in advance, e.g., during manufacture of the stress-detecting element 100a, a pressing force only is applied to the elastic body 14 with the applied pressing force being varied, and the signal values (reference positive pressure signal value ($V_{top}$)) outputted from the piezoelectric elements 13 in response to the pressing forces are measured. Herein, the membrane 121 is formed into a uniform film, the piezoelectric elements 13 are disposed in positions equidistant from the center of the membrane 121, and the piezoelectric elements 13 are each formed into the same shape. Therefore, the reference positive pressure signal values ($V_{top}$) outputted from the piezoelectric elements 13 in the case that only positive pressure is applied are the same value.

Likewise, in advance, a shearing force only is applied to the elastic body 14 in the X direction with the applied shearing force being varied, and the signal values (reference X shearing signal values ($V_{A0}$, $V_{B0}$)) outputted from the first piezoelectric element 13A and the second piezoelectric element 13B in response to the shearing forces are measured. Similarly, a shearing force only is applied to the elastic body 14 in the Y direction, the applied shearing force is varied, and the signal values (reference Y shearing signal values ($V_{C0}$, $V_{D0}$)) outputted from the third piezoelectric element 13C and the fourth piezoelectric element 13D in response to the shearing forces are measured. Furthermore, calculated at this time are: a reference X differential absolute value ($|V_{A0}-V_{B0}|$), which is the absolute value of the signal differential value in response to the shearing force along the X direction; and a reference Y differential absolute value ($|V_{C0}-V_{D0}|$), which is the signal differential value in response to the shearing force along the Y direction.

The signal output values ($V_A$, $V_B$, $V_C$, $V_D$) from the piezoelectric elements 13 (13A, 13B, 13C, 13D) are measured for the case in which the object Z makes contact with the elastic body 14 and the membrane 121 deforms in the manner shown in FIGS. 4B and 5.

Here, the first piezoelectric element 13A and the second piezoelectric element 13B output a signal value based on the total of the positive pressure and the shearing force in the X direction, and the third piezoelectric element 13C and the fourth piezoelectric element 13D output a signal value based on the total of the positive pressure and the shearing force in the Y direction. In other words, the signal output values ($V_A$, $V_B$, $V_C$, $V_D$) of the piezoelectric elements 13 are expressed as the combination of the reference positive pressure signal value $V_{top}$ and the reference X shearing signal values ($V_{A0}$, $V_{B0}$), and a combination of the reference positive pressure signal value $V_{top}$ and the reference Y shearing signal values ($V_{C0}$, $V_{D0}$), as shown in the formulas (1) to (4) below.

Formulas (1) to (4)

$$V_A = V_{top} + V_{A0} \quad (1)$$

$$V_B = V_{top} + V_{B0} \quad (2)$$

$$V_C = V_{top} + V_{C0} \quad (3)$$

$$V_D = V_{top} + V_{D0} \quad (4)$$

Therefore, eliminating $V_{top}$ by the difference between the formula (1) and formula (2) enables the direction of the shearing force in the X direction to be determined, and the magnitude of the shearing force in the X direction to be determined from the absolute value of the differential value. $V_{A0}$ and $V_{B0}$ have opposite signs and the absolute values are substantially the same. Therefore, the $V_{top}$ can be calculated from the formula (1) or the formula (2), and the magnitude of the positive pressure can be obtained.

In the same manner, the direction and magnitude of the shearing force in the Y direction can be obtained from the difference between formulas (3) and (4), and $V_{C0}$ and $V_{D0}$ thus obtained are substituted into formula (3) or formula (4), whereby $V_{top}$ that corresponds to the magnitude of the positive pressure can be obtained.

4. Effect of First Embodiment

As described above, the stress-detecting element 100 of the first embodiment comprises: the sensor substrate 11 in which the opening part 111 having the first rectilinear section 111A and the second rectilinear section 111B is disposed; the support film 12 provided with the membrane 121 that blocks off the opening part 111; the piezoelectric elements 13 disposed along first rectilinear section 111A and so as to straddle the first rectilinear section 111A across the inside and outside of the membrane 121; the first elastic part 141A disposed across the inside and outside of the membrane 121 so as to straddle the first rectilinear section 111A; and the second elastic part 141B disposed across the inside and outside of the membrane 121 so as to straddle the second rectilinear section 111B. In such a configuration, the first elastic part 141A presses the membrane 121 of the opening part 111 side, and the second elastic part 141B pulls the membrane 121 in the direction away from the opening part 111 in the case that the shearing force is applied toward, e.g., the +X direction when the object Z makes contact with and shearing force is applied to the first elastic part 141A and the second elastic part 141B along the X direction. In the case that shearing force is applied in the −X direction, the first elastic part 141A pulls the membrane 121 away from the opening part 111 and the second elastic part 141B presses the membrane 121 into the opening part 111. As described above, the first elastic part 141A and the second elastic part 141B impart a force to the membrane 121 in opposite directions, the center position of the membrane 121 (the position corresponding to the elastic-parts gap Gx) forms an inflection point, and the entire membrane 121 bends in a sinusoidal shape.

The elastic-parts gap Gx is disposed between the first elastic end section 143A of the first elastic part 141A and the second elastic end section 143B of the second elastic part 141B, and the elastic body 14 is not disposed on the membrane 121 in the elastic-parts gap Gx. Therefore, the membrane 121 can readily deform without being obstructed by the elastic body 14, and the amount of bending of the membrane 121 is increased. Accordingly, the bending of the first piezoelectric element 13A is also increased, the signal value outputted from the first piezoelectric element 13A is increased, and detection precision can be further improved.

The stress-detecting element 100 can be readily formed by layering the support film 12, the piezoelectric elements 13, and the elastic body 14 on the sensor substrate 11, as described above. Therefore, manufacturing efficiency is favorable, and manufacturing costs can also be reduced.

With the stress-detecting element 100 of the present embodiment, the first elastic end section 143A of the first elastic part 141A, the second elastic end section 143B of the second elastic part 141B, the first rectilinear section 111A, and the second rectilinear section 111B are parallel to each other. The distance L from the first rectilinear section 111A to the first elastic end section 143A is the same as the distance L from the second rectilinear section 111B to the second elastic end section 143B.

Therefore, the bending shape of the membrane 121 can be made uniform, and detection of the shearing force and the positive pressure can be carried out with high precision regardless of the Y coordinate when the shearing force acts on the elastic body 14 in the X direction.

The distance L described above is furthermore formed to be 20% of the length dimension of one side of the opening part 111 (the dimension Lw from the first rectilinear section 111A to the second rectilinear section 111B). Specifically, the distance L is formed within a range of 10% to 30% of the distance Lw.

Accordingly, sufficient stress required for bending the membrane 121 can be transmitted from the first elastic part 141A and the second elastic part 141B to the membrane 121, and bending of the membrane 121 is not obstructed because the elastic body 14 is not formed in the center area of the membrane 121, which is in the vicinity of the inflection point. Therefore, the membrane 121 can be advantageously bent by the first elastic part 141A and the second elastic part 141B, and detection precision can be further improved.

The first elastic part 141A, the second elastic part 141B, the third elastic part 141C, and the fourth elastic part 141D are formed so as to cover the first piezoelectric element 13A, the second piezoelectric element 13B, the third piezoelectric element 13C, and the fourth piezoelectric element 13D, respectively.

In such a configuration, the piezoelectric elements 13 are protected by the first elastic part 141A, the second elastic part 141B, the third elastic part 141C, and the fourth elastic part 141D, and the piezoelectric elements 13 can be made to bend in a stable manner.

In the present embodiment, the first piezoelectric element 13A, the second piezoelectric element 13B, the third piezoelectric element 13C, and the fourth piezoelectric element 13D are disposed so as to correspond to the rectilinear sections 111A to 111D, respectively, of the opening part 111.

Accordingly, shearing force in the X direction can be detected with better precision using the signals outputted from both the first piezoelectric element 13A and the second piezoelectric element 13B, and shearing force in the Y direction can be detected with better precision using the signals outputted from both the third piezoelectric element 13C and the fourth piezoelectric element 13D.

Furthermore, the use of the stress-detecting element 100 makes it possible to calculate the differential value between $V_{A0}$ and $V_{B0}$ and the differential value between $V_{C0}$ and $V_{D0}$ from the signal values ($V_A$, $V_B$, $V_C$, $V_D$) outputted from the piezoelectric elements 13, whereby the direction and magnitude of shearing force can be readily calculated, and positive pressure can also be readily calculated.

The first elastic part 141A, the second elastic part 141B, the third elastic part 141C, and the fourth elastic part 141D are formed in positions of the elastic body 14 that overlap the center area of the membrane 121 as seen in plan view of the sensor, and are furthermore integrally formed in the shape of a square slit 141. The formation of the piezoelectric elements 14 can be facilitated by the use of such a configuration, the efficiency of manufacturing the stress-detecting element 100 can be improved, and manufacturing costs can be reduced.

Second Embodiment

Next, a tactile sensor, which is a sensor module provided with the stress-detecting element 100, will be described with reference to the accompanying drawings, using a stress-detecting element 100 such as that described above as an application example.

Figure 6:
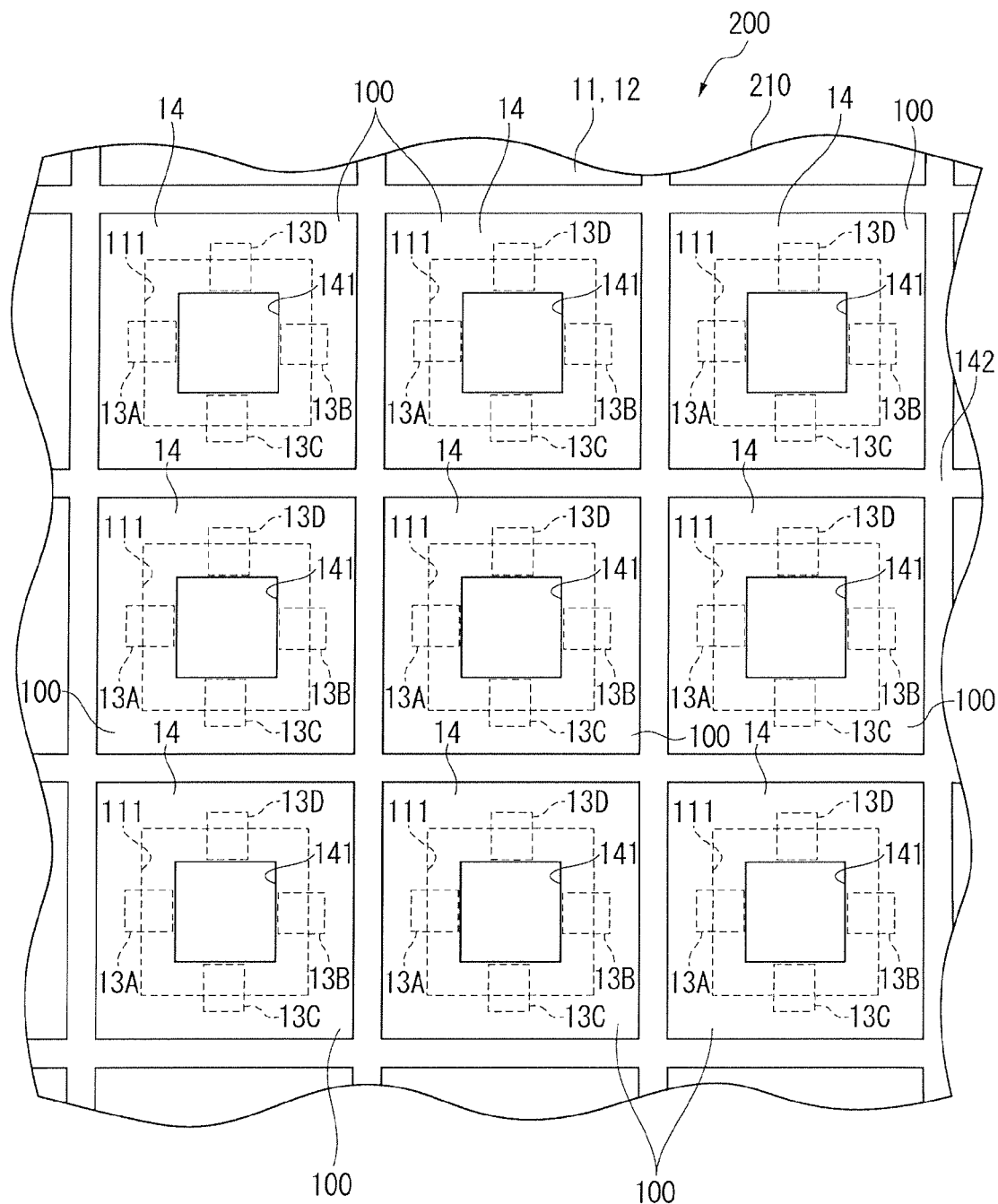
FIG. 6 is a plan view in which a portion of a tactile sensor of a second embodiment has been enlarged.
Figure 7:
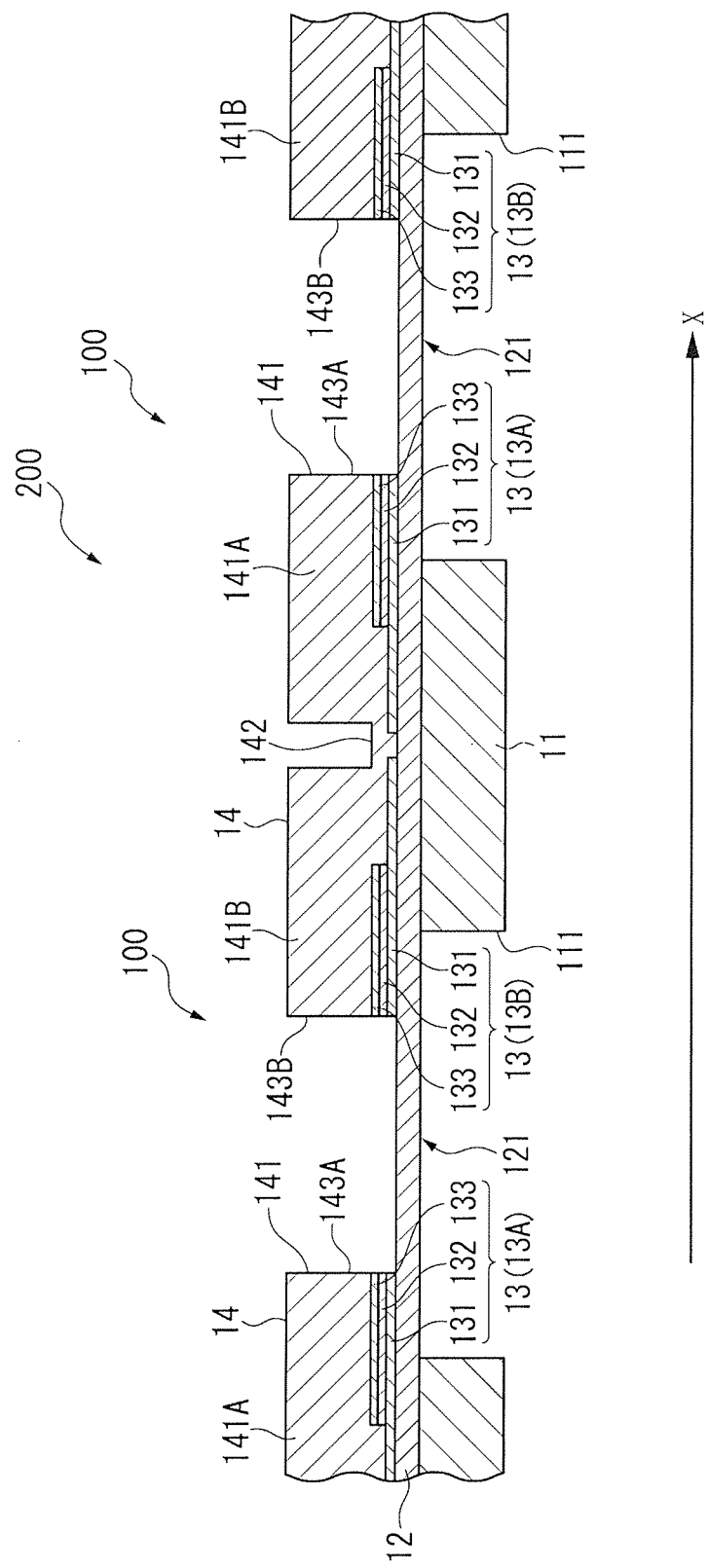
FIG. 7 is a cross-sectional view in which a portion of the tactile sensor of the second embodiment has been sectioned.

FIG. 6 is a plan view in which a portion of the tactile sensor of the second embodiment has been enlarged. FIG. 7 is a cross-sectional view in which a portion of the tactile sensor has been sectioned.

The tactile sensor 200 is provided with a plurality of the stress-detecting elements 100 of the first embodiment, as shown in FIG. 6. These stress-detecting elements 100 are provided in a sensor array 210 arranged in the form of an array, e.g., a matrix, on sensor substrate 11, which constitutes the support body of the present invention. Here, in these stress-detecting elements 100, the sensor substrate 11, the support film 12, and the elastic body 14 are composed of shared members. Specifically, a plurality of opening parts 111 arranged in the form of a matrix is formed on a single sensor substrate 11, and a contiguous support film 12 is formed on the entire surface of one side of the sensor substrate 11. The membrane 121 covering each of the opening parts 111 is formed thereby. The elastic body 14 disposed on the support film 12 is also shared in the stress-detecting elements 100, the elastic body 14 is formed so as to cover the entire surface of the support film 12, and a slit 141 is formed in the center area of the opening parts 111 of the stress-detecting elements 100.

A restriction groove 142 is formed in the elastic body 14, as shown in FIG. 7, between the stress-detecting elements 100. The restriction groove 142 is formed to a predetermined depth dimension from the surface of the elastic body 14 in contact with an object toward the support film 12. With such a tactile sensor 200, the elastic body 14 of the stress-detecting elements 100 is separated by the restriction groove 142, and the bending of the elastic body 14 of a stress-detecting element 100 is not transmitted to the elastic body 14 of adjacent stress-detecting elements 100.

In FIG. 7, the restriction groove 142 of the elastic body 14 may be formed to a depth dimension of, e.g., about ¾ the film thickness of the elastic body 14 from the contact surface that can make contact with an object, but no limitation is imposed thereby, and it is also possible to use a configuration in which the restriction groove 142 is formed to the surface of the support film 12.

Furthermore, an example is shown in which the restriction groove 142 is formed in a rectangular ring that surrounds the stress-detecting elements 100 in a plan view of the sensor as shown in FIG. 6, but no limitation is imposed thereby, and it is also possible to use a configuration in which, e.g., the restriction groove is formed so as to surround the stress-detecting elements 100 in a substantially annular shape.

Effects of Second Embodiment

The tactile sensor 200 of the second embodiment as described above is provided with a plurality of stress-detecting elements 100 configured in a two-dimensional array structure in which the stress-detecting elements 100 are arranged in the form of a matrix.

Accordingly, the tactile sensor 200 is disposed on, e.g., the sensor surface with which an object makes contact, and is therefore capable of detecting shearing force and positive pressure imparted to the sensor surface by the object.

In adjacent stress-detecting elements 100, the restriction groove 142 is formed in the elastic body 14. Accordingly, shearing force, positive pressure, and other stress is applied to only the elastic body 14 of a predetermined stress-detecting element 100, and even when the elastic body 14 bends, it is possible to reduce a drawback in which the bending of the elastic body 14 is propagated to the elastic body 14 of an adjacent stress-detecting element 100. Therefore, the shearing force and stress that act on an arbitrary position of the tactile sensor 200 can be accurately detected.

Third Embodiment

The configuration of the gripping device as an example of an electronic apparatus that uses the tactile sensor 200 described above will next be described with reference to the accompanying drawings.

Figure 8:
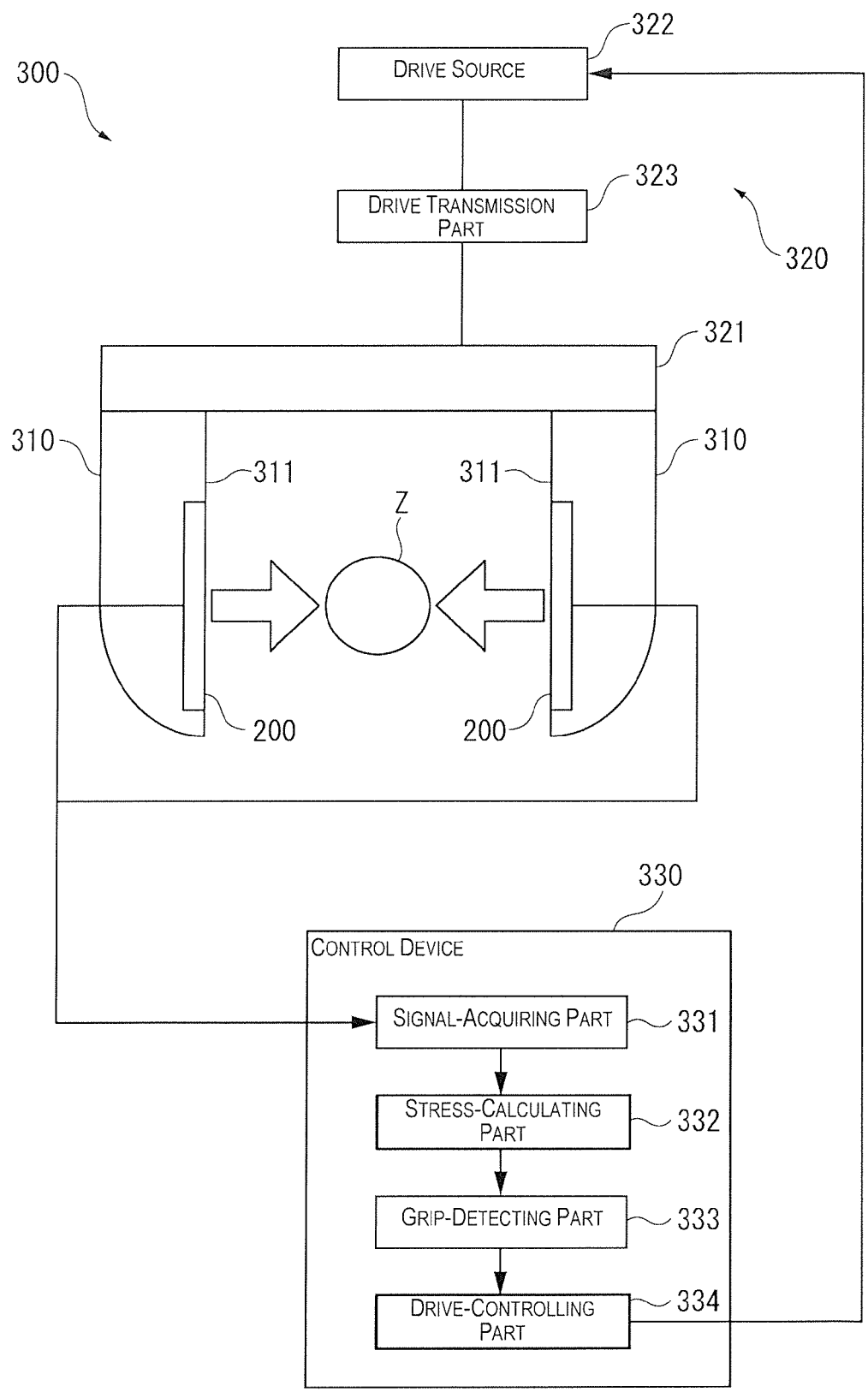
FIG. 8 is a device block view showing the schematic configuration of a gripping device of a third embodiment.

FIG. 8 is a device block view showing the schematic configuration of the gripping device of the third embodiment of the present invention.

In FIG. 8, the gripping device 300 is provided with at least one pair of gripping arms 310, and is a device for gripping an object Z using the gripping arms 310. For example, the gripping device 300 is a device for gripping and lifting an object conveyed by a belt conveyor or the like in a manufacturing plant or the like for manufacturing a product. The gripping device 300 is configured to have the gripping arms 310, an arm drive part 320 for driving the gripping arms 310, and a control device 330 (signal processing part) for controlling the driving of the arm drive part 320.

The pair of gripping arms 310 are provided with gripping surfaces 311, which are contact surfaces, at the distal end of each arm, and the gripping surfaces 311 make contact with and grip the object Z to thereby grip and lift the object Z. Here, the configuration in which a pair of the gripping arms 310 is provided is used as an example in the present embodiment, but no limitation is imposed thereby, and it is also possible to use a configuration in which the object Z is gripped by three support points using, e.g., three gripping arms 310.

The gripping surfaces 311 provided to the gripping arms 310 have the tactile sensor 200 described in the second embodiment provided to the surfaces, and the elastic body 14 of surface parts of the tactile sensor 200 is exposed. The gripping arms 310 bring the elastic body 14 into contact with the object Z, and apply a predetermined pressure (positive pressure) to the object Z to thereby grip the object Z. With such gripping arms 310, the positive pressure applied to the object Z and the shearing force imparted when the object Z attempts to slip and fall from the gripping surfaces 311 when the object is gripped are detected by the tactile sensor 200 provided to the gripping surfaces 311, and an electric signal that corresponds the positive pressure and the shearing force is outputted to the control device 330.

The arm drive part 320 is a device for moving the pair of gripping arms 310 in the direction of mutual approach and separation. The arm drive part 320 is provided with a holding member 321 for movably holding the gripping arms 310, a drive source 322 for generating a drive force that moves the gripping arms 310, and a drive transmission part 323 for transmitting the drive force of the drive source to the gripping arms 310.

The holding member 321 is provided with a guide groove along the movement direction of the gripping arms 310, and the gripping arms 310 are held in the guide groove to thereby movably hold the gripping arms 310. The holding member 321 is movably provided in the vertical direction.

The drive source 322 is, e.g., a drive motor that generates drive force in accordance a drive control signal inputted from the control device 330.

The drive transmission part 323 is composed of, e.g., a plurality of gears, and transmits the drive force generated by the drive source 322 to the gripping arms 310 and the holding member 321 to move the gripping arms 310 and the holding member 321.

In the present embodiment, the configuration described above is an example, but no limitation is imposed thereby. Specifically, no limitation is imposed by the configuration in which the gripping arms 310 are moved along a guide groove of the holding member 321, and it is also possible to use a configuration in which the gripping arms are rotatably held, or to use another configuration. The drive source 322 is not limited to being a drive motor, and it is also possible to use a configuration in which driving is carried out using, e.g., a hydraulic pump or the like. The drive transmission part 323 is not limited to a configuration in which, e.g., the drive force is transmitted using a gear, and it is also possible to use a configuration in which the drive force is transmitted by a belt or a chain, or a configuration provided with a piston driven by hydraulic pressure or the like.

The control device 330 is connected to the arm drive part 320 and the tactile sensor 200 disposed on the gripping surfaces 311 of the gripping arms 310, and controls the entire operation for gripping the object Z by the gripping device 300.

Specifically, the control device 330 is connected to the arm drive part 320 and the tactile sensor 200, as shown in FIG. 8, and controls the entire operation of the gripping device 300. The control device 330 is provided with signal-acquiring part 331 for reading detection signals inputted from the piezoelectric elements 13 in the stress-detecting elements 100 of the tactile sensor 200, stress-calculating part 332 for calculating shearing force and positive pressure, grip-detecting part 333 for detecting the slippage state of the object Z, and drive-controlling part 334 for outputting a drive control signal to the arm drive part 320 in order to control the driving of the gripping arms 310. The control device 330 is provided with a storage part (not shown) for storing positive pressure-related data and shearing force-related data that are measured at the time the stress-detecting elements 100 are manufactured, positive pressure-related data being data that corresponds to the positive pressure and the reference positive pressure signal value ($V_{top}$), and shearing force-related data being data that corresponds to the shearing force, the reference X shearing signal values ($V_{A0}, V_{B0}$), the reference Y shearing signal values ($V_{C0}, V_{D0}$), the reference X differential absolute value ($|V_{A0}-V_{B0}|$), and the reference Y differential absolute value ($|V_{C0}-V_{D0}|$).

The control device 330 may be, e.g., a personal computer or another general-use computer, and may be configured with, e.g., a keyboard or other input device, a display for displaying the gripped state of the object Z, or other peripheral devices.

The signal-acquiring part 331, the grip-detecting part 333, and the drive-controlling part 334 may be stored as a program in, e.g., memory or another storage part, and suitably read out by a CPU or other computing circuit; or may be composed of e.g., an IC or other type of integrated circuit that processes inputted electric signals in a predetermined manner.

The signal-acquiring part 331 is connected to the tactile sensor 200 and acquires detection signals inputted from the piezoelectric elements 13 in the stress-detecting elements 100 of the tactile sensor 200. The detection signals ascertained by the signal-acquiring part 331 are outputted to and stored in the storage part, and are outputted to the grip-detecting part 333.

The stress-calculating part 332 calculates the differential value ($V_A-V_B$) of the detection signals $V_A, V_{13}$ acquired by the signal-acquiring part 331, and determines whether the values is a positive value or a negative value. Here, in the case that the differential value is, e.g., a positive value, it is determined that shearing force is acting on the elastic body 14 in the +X direction, and in the case that the value is negative, it is determined that shearing force is acting in the –X direction.

As described above, it is possible to derive $|V_A-V_B|=|V_{A0}-V_{B0}|$ from the formulas (1) and (2). Therefore, the stress-calculating part 332 can obtain the magnitude of the shearing force and the reference X shearing signal values $V_{A0}, V_{B0}$ based on the shearing force-related data and the absolute value ($|V_A-V_B|$) of the signal differential values thus calculated.

The stress-calculating part 332 furthermore substitutes reference X shearing signal values $V_{A0}, V_{B0}$ into formula (1) or (2) to calculate the reference positive pressure signal value $V_{top}$, and obtains the positive pressure that corresponds to the reference positive pressure signal value $V_{top}$ from the positive pressure-related data.

The grip-detecting part 333 determines whether the object Z has been gripped by the gripping arms 310 based on the positive pressure and the shearing force calculated by the stress-calculating part 332.

Figure 9:
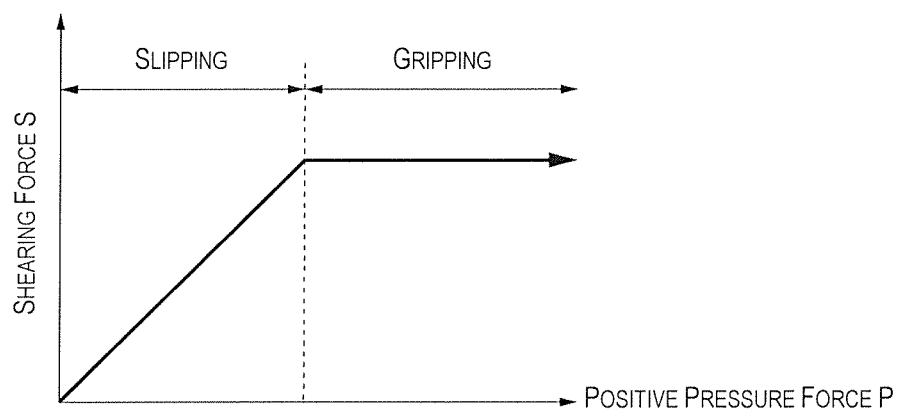
FIG. 9 is a view showing the relationship between the pressing force and the shearing force that act on a tactile sensor in the gripping operation of the gripping device.

Here, FIG. 9 shows a view of the relationship between the pressing force and the shearing force that act on the tactile sensor in the gripping operation of the gripping device 300.

In FIG. 9, the shearing force increases in accordance with the increase in positive pressure until the positive pressure reaches a predetermined value. This state is a state in which a dynamic frictional force is acting between the object Z and the gripping surfaces 311, and the grip-detecting part 333 determines that gripping is not yet complete in a slipping state in which the object Z is slipping and falling from the gripping surfaces 311. On the other hand, when the positive pressure is equal to or greater than a predetermined value, the state is one in which the shearing force does not increase even when the positive pressure is increased. This state is a state in which a static frictional force is acting between the object Z and the gripping surfaces 311, and the grip-detecting part 333 determines that the state is a gripped state in which the object Z is gripped by the gripping surfaces 311.

Specifically, it is determined that gripping has been completed in the case that the value of the shearing force exceeds a predetermined threshold value that corresponds to the static frictional force.

The drive-controlling part 334 controls the operation of the arm drive part 320 based on electric signals detected by the grip-detecting part 333.

Effects of Third Embodiment

A tactile sensor 200 of the second embodiment is provided to a gripping device 300 such as that described in the third embodiment above. Such a tactile sensor 200 is capable of readily detecting shearing force and positive pressure with favorable precision as described above. Therefore, the gripping operation can be carried out accurately in the gripping device 300 as well based on a high-precision shearing force detection signal and positive pressure detection signal.

With such a tactile sensor 200, shearing force can be detected in both the X direction and the Y direction. Therefore, in the third embodiment, shearing force is measured for lifting object Z, but shearing force can also be measured in the conveyance direction when, e.g., an object conveyed on a conveyor belt is to be gripped.

Fourth Embodiment

In the third embodiment described above, a gripping device provided with the tactile sensor 200 is used as an example of an electronic apparatus, but no limitation is imposed thereby.

In the fourth embodiment, an iron provided with the tactile sensor 200 is next described with reference to the accompanying drawings as another application example of a device that uses the tactile sensor 200.

Figure 10:
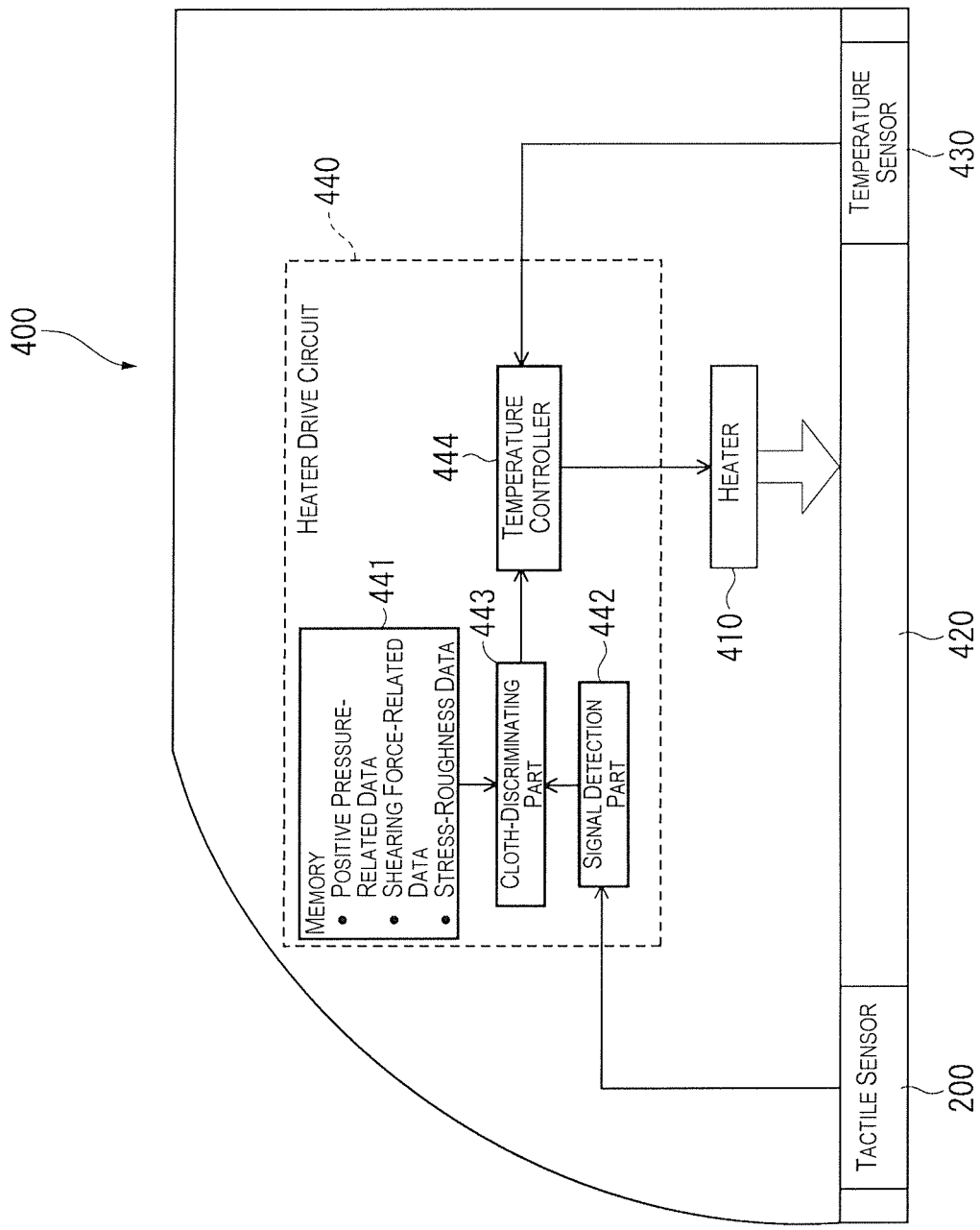
FIG. 10 is a block view showing the schematic configuration of an iron of a fourth embodiment.

FIG. 10 is a block view showing the schematic configuration of the iron of the fourth embodiment.

The iron 400 comprises a heater 410, a base part 420, a temperature sensor 430 disposed in the base part 420, the tactile sensor 200 disposed in the base part 420, and a heater drive circuit 440 (signal processing part). The heater drive circuit 440 of the iron 400 controls the voltage applied to the heater 410 based on a signal from the temperature sensor 430 and the tactile sensor 200, and heats the base part 420 to an optimal temperature in relation to a target fabric.

The heater 410 emits heat due to voltage applied from the heater drive circuit 440 and heats the base part 420.

The base part 420 is a portion that makes contact with target fabric and stretches out wrinkles in the target fabric, and is heated by the heater 410. The tactile sensor 200 is disposed in a portion of the base part 420, as shown in FIG. 10, and the elastic body 14 of the tactile sensor 200 is exposed so as to be capable of contact with the target fabric.

The temperature sensor 430 is disposed in the base part 420, and the temperature sensor 430 detects and outputs the temperature of the base part 420 to the heater drive circuit 440.

The heater drive circuit 440 is connected to the tactile sensor 200, the temperature sensor 430, and the heater 410, and controls the voltage applied to the heater 410 based on signals from the tactile sensor 200 and the temperature sensor 430. The heater drive circuit 440 is provided with a memory 441, a signal detection part 442, a fabric-distinguishing part 443, and a temperature controller 444, as shown in FIG. 10.

The heater drive circuit 440 may be configured as, e.g., a computer provided with a CPU or other computing circuit, and a storage circuit; and the fabric-distinguishing part 443 and temperature controller 444 may be configured so as to function as software that is executed by computational processing carried out by a computing circuit, or may be, e.g., an IC or other type of integrated circuit that processes inputted electric signals in a predetermined manner.

The memory 441 stores positive pressure-related data and shearing force-related data in the same manner as the storage part of the third embodiment described above. The memory 441 also stores stress-roughness value data in which the roughness value of the target fabric is recorded in correlation with the stress detected by the tactile sensor 200. An example of the stress-roughness value is a roughness value recorded for each positive pressure in correlation with the shearing force.

The roughness-temperature data in which the optimal temperature of the base part 420 is recorded in correlation with the roughness value may be stored in the memory 441.

The signal detection part 442 is connected to the tactile sensor 200 and acquires the signal detection signals ($V_A$, $V_B$, $V_C$, $V_D$) inputted from the tactile sensor 200. The signal detection part 442 calculates the positive pressure and the shearing force based on the detection signals thus acquired, the positive pressure-related data, the shearing force-related data, and the formulas (1) to (4), using the same method as that of the stress-calculating part 332 in the third embodiment.

The fabric-distinguishing part 443 discriminates the type of target fabric based on the shearing force and positive pressure calculated by the signal detection part 442, and the stress-roughness value data stored in the memory 441.

For example, in the present embodiment, the roughness that corresponds to the shearing force is stored as stress-roughness data for each positive pressure. In this case, the fabric-distinguishing part 443 reads from the memory 441 the stress-roughness value data that corresponds to the positive pressure, and acquires from the stress-roughness value data the roughness value that corresponds to the shearing force.

The fabric-distinguishing part 443 outputs the roughness value thus acquired to the temperature controller 444.

The temperature controller 444 controls the voltage applied to the heater 410 based on the roughness value inputted from the fabric-distinguishing part 443 and the temperature of the base part 420 detected by the temperature sensor 430.

Specifically, the temperature controller 444 reads the roughness-temperature data from the memory 441 and acquires the optimal temperature of the base part 420 that corresponds to the roughness value inputted from the fabric-distinguishing part 443. The temperature controller 444 calculates the required voltage value to be applied to the heater 410 from the differential value between the optimal temperature and the detected temperature inputted from the temperature sensor 430, in order to set the base part 420 to an optimal temperature, and then applies the voltage to the heater 410.

Effects of Fourth Embodiment

The tactile sensor 200 of the third embodiment is provided to the iron 400 of the fourth embodiment as described above. Such a tactile sensor 200 can readily detect shearing force and positive pressure with favorable precision, as described above. Therefore, positive pressure and shearing force can be detected with high precision in the iron 400 when the target fabric comes into contact with the base part 420.

Using the fabric-distinguishing part 443, the heater drive circuit 440 of the iron 400 is capable of discriminating the roughness of the target fabric that corresponds to the detected positive pressure and shearing force. Therefore, the type of target fabric can be determined from the roughness of the target fabric thus determined, and the temperature controller 444 can set the temperature of the base part 420 in correspondence with the type of fabric. Therefore, in the iron 400, the temperature of the base part 420 can be automatically set in correspondence with the fabric, and the laborious work of changing the temperature setting that corresponds to the type of the target fabric can be forgone.

In the fourth embodiment, an example is described in which the roughness value that corresponds to the positive pressure and shearing force is recorded in the stress-roughness value data, which is stored in the memory 441, but it is also possible to use a configuration such as one in which, e.g., the type of target fabric that corresponds to the positive pressure and shearing force is recorded in stress-fabric type data, which is stored in the memory 441. In this case, the fabric-distinguishing part 443 directly discriminates the type of target fabric that corresponds to the positive pressure and shearing force, and the temperature controller 444 acquires the temperature that corresponds to the type of fabric thus discriminated.

The optimal temperature of the base part 420 that corresponds to the positive pressure and shearing force may be recorded in stress-temperature data, which may be stored as correlation data. In this case, the roughness-temperature data is not required to be stored, and it is possible to provide an iron 400 in which the temperature of the base part 420 can be automatically set using a lesser amount of data.

In the iron 400, an example was described in which the temperature of the base part 420 is automatically set by the heater drive circuit 440, but it is also possible to use a configuration in which it is possible to switch as appropriate between an automatic mode for automatically setting the temperature of the base part 420 and a manual mode for manually setting the temperature.

Fifth Embodiment

A fifth embodiment is next described with reference to the accompanying drawings.

In the fifth embodiment, a notebook computer 500 provided with the tactile sensor 200 is used as another example of the electronic apparatus of the present invention.

Figure 11:
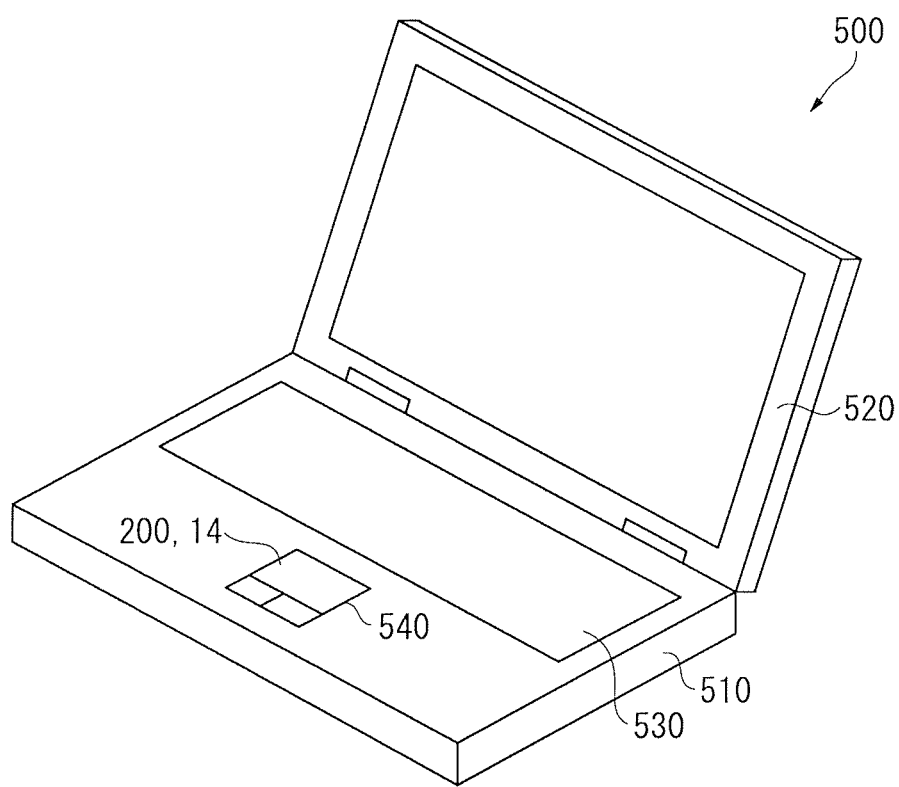
FIG. 11 is a perspective view showing the schematic configuration of a notebook computer of a fifth embodiment.

FIG. 11 is a perspective view showing the schematic configuration of the notebook computer 500 of the fifth embodiment.

In FIG. 11, the notebook computer 500 is provided with a device main body 510, a display 520, a first input part 530, and a second input part 540.

The display 520 is composed of, e.g., a liquid-crystal panel, an organic panel, or the like; is connected to the computing controller (not shown) accommodated inside the device main body 510; and is configured so as to display various operational images and other information using the computing controller.

The first input part 530 is composed of a keyboard, a numerical keypad, or the like.

The second input part 540 is disposed in a position in front of the first input part 530, and the tactile sensor 200 described above is used as the second input part 540. The surface of the elastic body 14 of the tactile sensor 200 is exposed on the surface of the second input part 540, as shown in FIG. 11, and the user moves a finger or moves a stylus or the like on the surface of the elastic body 14, whereupon a shearing force and/or positive pressure is generated by these movements. The shearing force and positive pressure are detected, whereby the contact position coordinates and movement direction of the user finger and/or touch pen can be detected and outputted as an electric signal. The details of the input operation desired by the user can be accurately ascertained based on the outputted electric signal, and the operability of the notebook computer 500 can be improved.

Other Embodiments

The present invention is not limited to the embodiments described above, and modifications, improvements, and the like that are within a range in which the objects of the present invention can be achieved are also included in the present invention.

Figure 12:
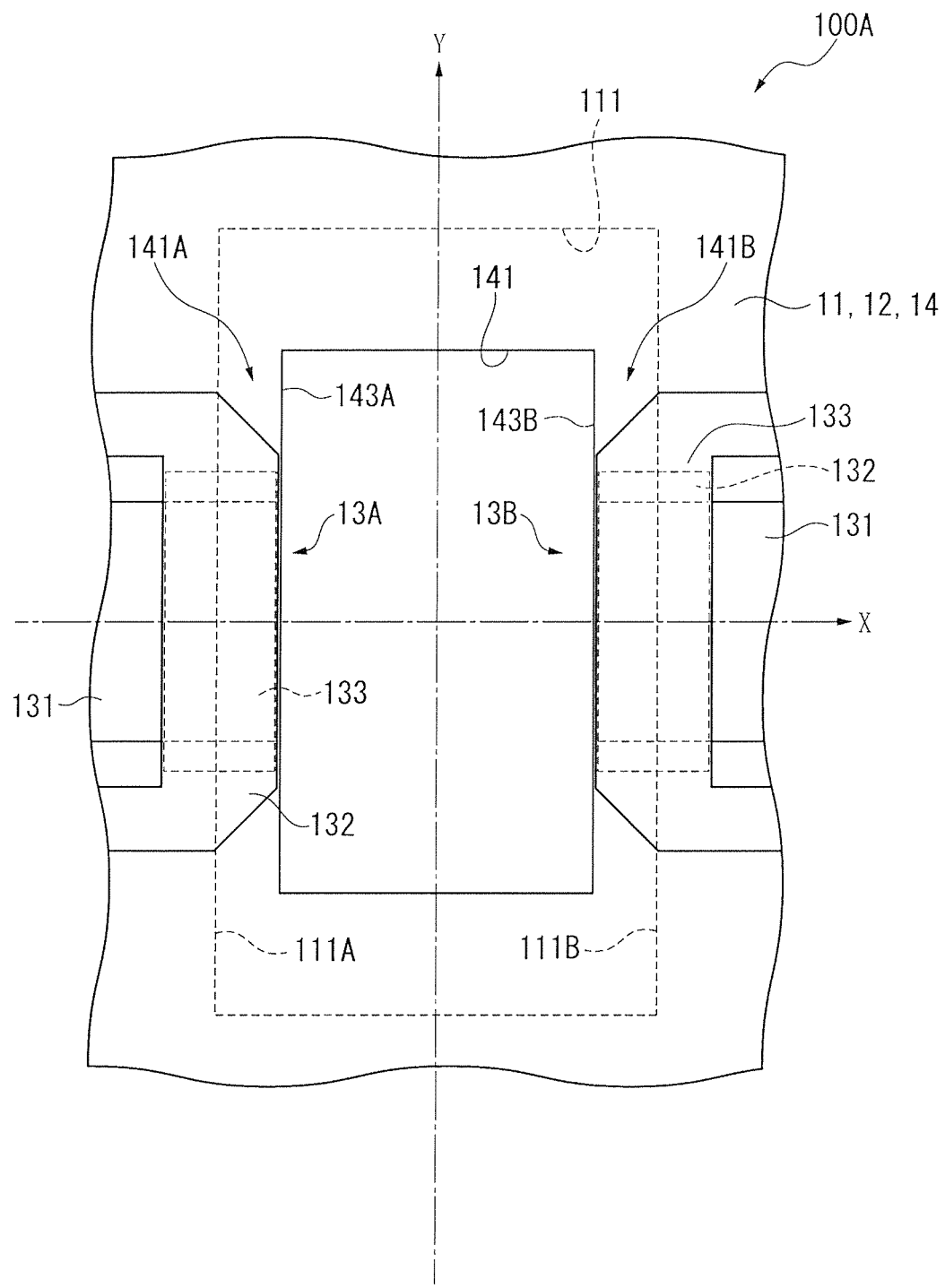
FIG. 12 is a plan view showing the stress-detecting element in another embodiment.

For example, described in the first embodiment is a stress-detecting element 100 capable of detecting both shearing force in the X direction and shearing force in the Y direction, but it is also possible to use a stress-detecting element for detecting, e.g., shearing force and positive pressure in the X direction, as shown in FIG. 12. In FIG. 1, portions of the piezoelectric elements 13A and 13B are shown in solid lines to better understand the structures thereof although the piezoelectric elements 13A and 13B are disposed below the elastic body 14.

In FIG. 12, the stress-detecting element 100A is a detection element for detecting the shearing force and pressing force in the X direction, and comprises the sensor substrate 11 provided with the opening part 111 having a pair of mutually parallel rectilinear sections (first rectilinear section 111A, second rectilinear section 111B), the support film 12, the piezoelectric elements 13 (first piezoelectric element 13A and second piezoelectric element 13B), and the elastic body 14. FIG. 12 shows an example in which the opening part 111 is formed in the shape of a rectangle, but any shape may be used provided that sinusoidal bending is generated in the membrane 121 when the shearing force is applied in the X direction. Therefore, it is possible to form an opening part 111 provided with the first rectilinear section 111A, the second rectilinear section 111B, and semicircular curved parts that connect the two end parts of the first rectilinear section 111A and the second rectilinear section 111B together.

In the stress-detecting element 100, 100A, a configuration is used for detecting shearing force and positive pressure in the X direction using both the first piezoelectric element 13A and the second piezoelectric element 13B, but it is also possible to dispose the first piezoelectric element 13A only along the first rectilinear section 111A, and leave the other second rectilinear section 111B without a piezoelectric element.

Furthermore, a configuration is used in the stress-detecting elements 100, 100A in which a hollow part 144 formed by the slit 141 is in communication with the exterior and a portion of the membrane 121 is exposed to the exterior, and when an object makes contact with the elastic parts 141A, 141B, 141C, 141D, shearing force is transmitted from the object to the membrane 121. However, no limitation is imposed thereby. For example, it is possible to use a configuration in which a contact film that makes contact with an object is disposed on the upper part of the elastic parts 141A, 141B, 141C, 141D, and a slit 141 is blocked off by the contact film. Such a contact film can be formed using the same material as the elastic parts 141A, 141B, 141C, 141D. Contact between the membrane 121 and an object can be prevented by providing such a contact film, and the membrane 121 can be protected.

In the second embodiment, a configuration is described in which a restriction groove 142 is formed in the elastic body 14 between mutually adjacent stress-detecting elements 100, as shown in FIGS. 9 and 10, but no limitation is imposed thereby. For example, it is also possible to use a configuration in which the restriction groove 142 is not formed, and in this case, the distance between the stress-detecting element 100 is ensured, thereby making it possible to reduce the propagation of bending from the elastic body 14 of the mutually adjacent stress-detecting elements 100. It is also possible to use a configuration in which an area separation member having greater rigidity than the elastic body 14 is disposed between mutually adjacent stress-detecting elements 100. In such a configuration, the amount of bending of the elastic body 14 is reduced because the area separation member, which has greater rigidity than the configuration in which the restriction groove 142 is disposed, is formed at the periphery of the elastic body 14, and it is possible to reduce the propagation of bending of the elastic body 14 from mutually adjacent stress-detecting elements 100.

In the first embodiment, a configuration is used in which the upper electrode 133 and lower electrode 131 are disposed in positions that do not mutually overlap when the sensor is viewed in a plan view such that the two electrodes do not make contact with each other, but not limitation is imposed thereby. For example, it is also possible to use a configuration in which the upper electrode 133 and the lower electrode 131 are disposed in positions that have overlapping portions when the sensor is viewed in a plan view provided that an insulating film is formed between the upper electrode 133 and the lower electrode 131.

An example is described in which the support body of the present invention is composed of a single sensor substrate 11, but it is also possible to use a configuration in which a single support substrate (support body) is disposed for each stress-detecting element 100, and the tactile sensor 200 is formed by securing these support substrates onto the sensor substrate.

The best modes for carrying out the present invention are described in detail above, but the present invention is not limited thereto. Specifically, the present invention has mainly been depicted and described in particular with relation to specific embodiments, but various modification and improvements can be made to the embodiments described above by a person skilled in the art without departing from the technical concepts and the scope of the objects of the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. A stress-detecting element comprising:
a support body having an opening part with a first rectilinear section and a second rectilinear section extending parallel to each other;
a support film disposed over the support body and blocking off the opening part;
a first piezoelectric element disposed over the support film along the first rectilinear section of the opening part of the support body so as to straddle the first rectilinear section from an interior area of the opening part to an exterior area of the opening part as seen in plan view along a film thickness direction of the support film, the first piezoelectric element being configured and arranged to output an electric signal upon deformation;
a first elastic part disposed over the support film along the first rectilinear section of the opening part of the support body so as to straddle the first rectilinear section from the interior area of the opening part to the exterior area of the opening part as seen in plan view, the first elastic part having a first elastic end section disposed in the interior area of the opening part as seen in plan view; and
a second elastic part disposed over the support film along the second rectilinear section of the opening part of the support body so as to straddle the second rectilinear section from the interior area of the opening part to the exterior area of the opening part as seen in plan view, the second elastic part having a second elastic end section disposed in the interior area of the opening part as seen in plan view, the second elastic end section being spaced apart from the first elastic end section, wherein
the first elastic end section of the first elastic part and the second elastic end section of the second elastic part are parallel to the first rectilinear section and the second rectilinear section as seen in plan view,
a distance from the first rectilinear section of the opening part to the first elastic end section is equal to a distance from the second rectilinear section to the second elastic end section as seen in plan view, and
each of the distance from the first rectilinear section of the opening part to the first elastic end section and the distance from the second rectilinear section to the second elastic end section is 10% to 30% of a distance from the first rectilinear section to the second rectilinear section.

2. The stress-detecting element recited in claim 1, wherein the first elastic part covers the first piezoelectric element.

3. The stress-detecting element recited in claim 1, further comprising
a second piezoelectric element disposed over the support film along the second rectilinear section of the opening part of the support body so as to straddle the second rectilinear section from the interior area of the opening part to the exterior area of the opening part as seen in plan view, the second piezoelectric element being configured and arranged to output an electric signal upon deformation.

4. The stress-detecting element recited in claim 1, wherein the opening part further includes a third rectilinear section and a fourth rectilinear section extending orthogonal to the first rectilinear section and the second rectilinear section,
the stress-detecting element further comprising
a third piezoelectric element disposed over the support film along the third rectilinear section of the opening part of the support body so as to straddle the third rectilinear section from the interior area of the opening part to the exterior area of the opening part as seen in plan view, the third piezoelectric element being configured and arranged to output an electric signal upon deformation;
a third elastic part disposed over the support film along the third rectilinear section of the opening part of the support body so as to straddle the third rectilinear section from the interior area of the opening part to the exterior area of the opening part when viewed in the plan view, the third elastic part having a third elastic end section disposed in the interior area of the opening part as seen in plan view; and
a fourth elastic part disposed over the support film along the fourth rectilinear section of the opening part of the support body so as to straddle the fourth rectilinear section from the interior area of the opening part to the exterior area of the opening part as seen in plan view, the fourth elastic part having a fourth elastic end section disposed in the interior area of the opening part as seen in plan view, the fourth elastic end section being spaced apart from the third elastic end section.

5. The stress-detecting element recited in claim 4, further comprising
a fourth piezoelectric element disposed over the support film along the fourth rectilinear section of the opening part of the support body so as to straddle the fourth rectilinear section from the interior area of the opening part to the exterior area of the opening part as seen in plan view, the fourth piezoelectric element being configured and arranged to output an electrical signal upon deformation.

6. The stress-detecting element recited in claim 4, wherein the first elastic part, the second elastic part, the third elastic part, and the fourth elastic part are integrally formed as one-piece, unitary member.

7. A sensor module comprising:
a sensor array including a plurality of the stress-detecting elements recited in claim 1 that are arranged in a form of an array.

8. An electronic apparatus comprising:
the sensor module recited in claim 7; and
a signal processing part configured and arranged to process electrical signals outputted from the sensor module.

* * * * *